US012694573B2

(12) United States Patent     (10) Patent No.:   US 12,694,573 B2

Schwarz et al.     (45) Date of Patent:     Jul. 28, 2026

(54) V3C OR OTHER VIDEO-BASED CODING PATCH CORRECTION VECTOR DETERMINATION, SIGNALING, AND USAGE

(71) Applicant: Nokia Technologies Oy, Espoo (FI)

(72) Inventors: Sebastian Schwarz, Unterhaching (DE); Patrice Rondao Alface, Evere (BE); Aleksei Martemianov, Tampere (FI); Lukasz Kondrad, Munich (DE); Lauri Aleksi Ilola, Munich (DE)

(73) Assignee: Nokia Technologies Oy, Espoo (FI)

( * ) Notice: Subject to any disclaimer, the term of this patent is extended or adjusted under 35 U.S.C. 154(b) by 589 days.

(21) Appl. No.: 18/123,570

(22) Filed: Mar. 20, 2023

(65) Prior Publication Data

US 2023/0298218 A1     Sep. 21, 2023

Related U.S. Application Data

(60) Provisional application No. 63/321,884, filed on Mar. 21, 2022.

(51) Int. Cl.
G06T 9/00     (2006.01)
G06T 17/20     (2006.01)

(52) U.S. Cl.
CPC ............ G06T 9/001 (2013.01); G06T 17/205 (2013.01)

(58) Field of Classification Search
CPC ....... G06T 17/205; G06T 9/001; G06T 9/004; G06T 9/007; G06T 9/40; G06T 17/20
See application file for complete search history.

(56) References Cited

U.S. PATENT DOCUMENTS 6,438,266 B1 * 8/2002 Bajaj ...................... G06T 9/001
                                          382/243
8,736,603 B2 * 5/2014 Curington ................. G06T 9/00
                                          345/581

(Continued)

FOREIGN PATENT DOCUMENTS

EP          3680859 A1 * 7/2020 ........... H04N 19/597
WO    WO-2020254719 A1 * 12/2020 ........... H04N 13/282

OTHER PUBLICATIONS

"Draco 3D Data Compression", https://goodgle.github.io/draco/, Mar. 9, 2022, 3 pages.

(Continued)

*Primary Examiner* — Vu Le

(74) *Attorney, Agent, or Firm* — McCarter & English, LLP

(57)        ABSTRACT

An apparatus obtains a mesh representation of a 3D object, and performs an encoding process: segmenting the 3D object into 2D projections; encoding the segmented 2D projections into a bitstream; reconstructing a 3D mesh from the segmented and encoded 2D projections; deriving an error vector, describing a shift between 3D data, from patches reconstructed from corresponding encoded patches of the bitstream, and original data in the mesh representation. The patches are submeshes of the reconstructed 3D mesh. The apparatus signals and transmits the error vector in or along with the bitstream. A decoder apparatus receives these and performs a decoding process to form decoded 2D projections of the mesh representation, reconstructs a 3D mesh from decoded 2D projections, applies the patch correction vector elements from the error vector in the decoding process or the reconstructing, produces a modified 3D mesh, as an output mesh and outputs the output mesh.

17 Claims, 12 Drawing Sheets

(56) References Cited

U.S. PATENT DOCUMENTS

| 11,915,373 | B1 * | 2/2024 | Mammou | G06T 15/04 |
|---|---|---|---|---|
| 2021/0090301 | A1 * | 3/2021 | Mammou | H04N 19/20 |
| 2022/0060529 | A1 * | 2/2022 | Oh | H04N 13/194 |
| 2023/0107834 | A1 * | 4/2023 | Zhang | H04N 19/597 |
| | | | | 382/232 |
| 2023/0162403 | A1 * | 5/2023 | Tian | G06T 9/001 |
| 2023/0281876 | A1 * | 9/2023 | Zhang | H04N 19/597 |
| | | | | 345/419 |

OTHER PUBLICATIONS

ISO/IEC 23090-5:20221(2E), "Information technology—Coded Representation of Immersive Media—Part 5: Visual Volumetric Video-based Coding (V3C) and Video-based point Cloud Compression (V-PCC)", Dec. 15, 2021, 379 pages.
Rhyu, Sungryeul, et al., "[V-PCC] [New Proposal] V-PCC extension for mesh coding", Samsung Electronics, ISO/IEC JTC1/SC29/WG11 m47608, Mar. 2019, 3 pages.
"CfP for Dynamic Mesh Coding", ISO/IEC/JTC 1/SC 29/WG7 N231, Nov. 8, 2021, 38 pages.

* cited by examiner

622 Output Mesh

620, Multiplexer

612 Vertex Attributes

614 Reconstructed Vertex coordinates

616 Vertex reordering

618 Vertex connectivity

608 MPEG-I VPCC decoder

610 Vertex connectivity decoder

606 Vertex connectivity auxiliary data

605

602 Compressed bitstream

604, Demultiplexer

600

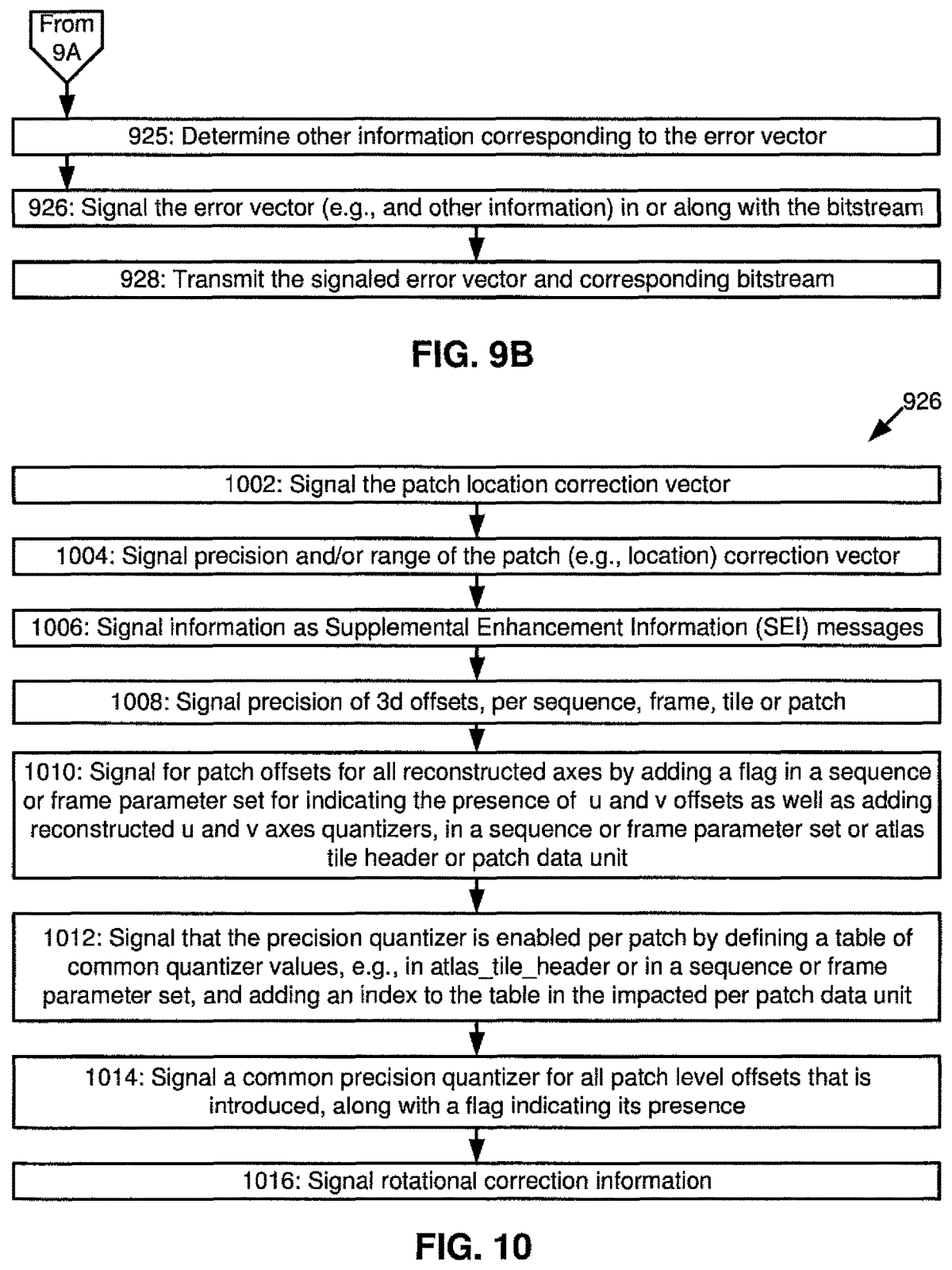

```
  From
   9A
```

925: Determine other information corresponding to the error vector

926: Signal the error vector (e.g., and other information) in or along with the bitstream 928: Transmit the signaled error vector and corresponding bitstream

1002: Signal the patch location correction vector

1004: Signal precision and/or range of the patch (e.g., location) correction vector 1006: Signal information as Supplemental Enhancement Information (SEI) messages 1008: Signal precision of 3d offsets, per sequence, frame, tile or patch 1010: Signal for patch offsets for all reconstructed axes by adding a flag in a sequence or frame parameter set for indicating the presence of u and v offsets as well as adding reconstructed u and v axes quantizers, in a sequence or frame parameter set or atlas tile header or patch data unit 1012: Signal that the precision quantizer is enabled per patch by defining a table of common quantizer values, e.g., in atlas_tile_header or in a sequence or frame parameter set, and adding an index to the table in the impacted per patch data unit 1014: Signal a common precision quantizer for all patch level offsets that is introduced, along with a flag indicating its presence 1016: Signal rotational correction information

FIG. 10

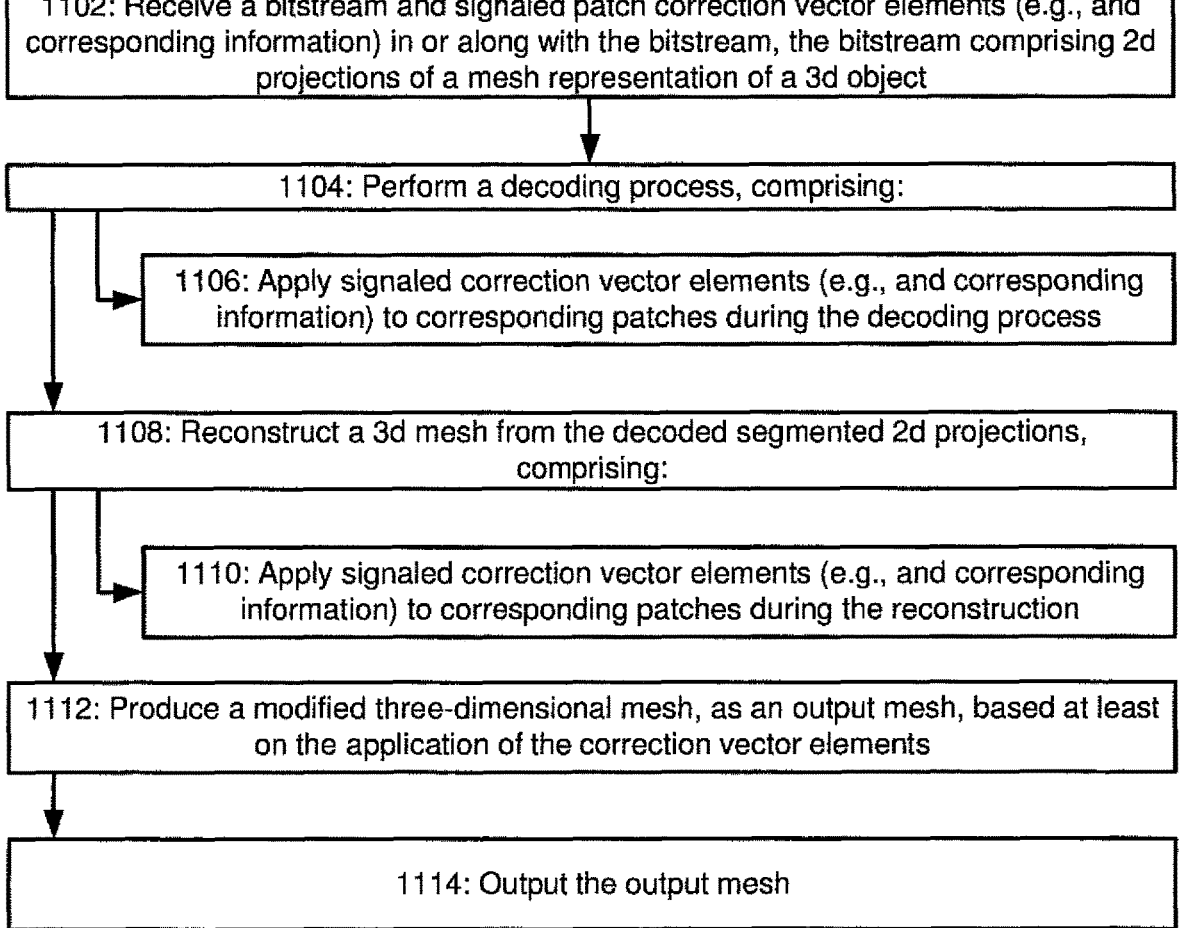

1102: Receive a bitstream and signaled patch correction vector elements (e.g., and corresponding information) in or along with the bitstream, the bitstream comprising 2d projections of a mesh representation of a 3d object 1104: Perform a decoding process, comprising:

1106: Apply signaled correction vector elements (e.g., and corresponding information) to corresponding patches during the decoding process 1108: Reconstruct a 3d mesh from the decoded segmented 2d projections, comprising:

1110: Apply signaled correction vector elements (e.g., and corresponding information) to corresponding patches during the reconstruction 1112: Produce a modified three-dimensional mesh, as an output mesh, based at least on the application of the correction vector elements 1114: Output the output mesh

FIG. 11

V3C OR OTHER VIDEO-BASED CODING PATCH CORRECTION VECTOR DETERMINATION, SIGNALING, AND USAGE

TECHNICAL FIELD

Exemplary embodiments herein relate generally to encoding, signaling and rendering of a volumetric video that is based on mesh coding and, more specifically, relates to systems for reconstructed mesh surfaces.

BACKGROUND

In video coding, an input mesh is processed in order to compress the mesh and create a bitstream. This processing creates sections of a processed mesh referred to as patches. The processing typically includes processing from three dimensions, into two dimensions, and back into three dimensions. This can create errors when reconstructing a 3d (three-dimensional) output mesh from a 3d input mesh.

BRIEF SUMMARY

This section is intended to include examples and is not intended to be limiting.

In an exemplary embodiment, a method is disclosed that includes obtaining by an apparatus a mesh representation of a three-dimensional object, and performing by the apparatus an encoding process comprising: segmenting the three-dimensional object into corresponding segmented two-dimensional projections; encoding the segmented two-dimensional projections into a bitstream; reconstructing a three-dimensional mesh from the segmented and encoded two-dimensional projections; deriving an error vector, describing a shift between three-dimensional data, from patches reconstructed from corresponding encoded patches of the bitstream, and original data in the mesh representation, the patches being submeshes of the reconstructed three-dimensional mesh. The method also includes signaling by the apparatus the error vector in or along with the bitstream, and transmitting by the apparatus the bitstream and the signaled error vector.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: obtaining by an apparatus a mesh representation of a three-dimensional object; performing by the apparatus an encoding process comprising: segmenting the three-dimensional object into corresponding segmented two-dimensional projections; encoding the segmented two-dimensional projections into a bitstream; reconstructing a three-dimensional mesh from the segmented and encoded two-dimensional projections; deriving an error vector, describing a shift between three-dimensional data, from patches reconstructed from corresponding encoded patches of the bitstream, and original data in the mesh representation, the patches being submeshes of the reconstructed three-dimensional mesh; signaling by the apparatus the error vector in or along with the bitstream; and transmitting by the apparatus the bitstream and the signaled error vector.

An exemplary computer program product includes a computer-readable storage medium bearing instructions that, when executed by an apparatus, cause the apparatus to perform at least the following: obtaining by an apparatus a mesh representation of a three-dimensional object; performing by the apparatus an encoding process comprising: segmenting the three-dimensional object into corresponding segmented two-dimensional projections; encoding the segmented two-dimensional projections into a bitstream; reconstructing a three-dimensional mesh from the segmented and encoded two-dimensional projections; deriving an error vector, describing a shift between three-dimensional data, from patches reconstructed from corresponding encoded patches of the bitstream, and original data in the mesh representation, the patches being submeshes of the reconstructed three-dimensional mesh; signaling by the apparatus the error vector in or along with the bitstream; and transmitting by the apparatus the bitstream and the signaled error vector.

In another exemplary embodiment, an apparatus comprises means for performing: obtaining by an apparatus a mesh representation of a three-dimensional object; performing by the apparatus an encoding process comprising: segmenting the three-dimensional object into corresponding segmented two-dimensional projections; encoding the segmented two-dimensional projections into a bitstream; reconstructing a three-dimensional mesh from the segmented and encoded two-dimensional projections; deriving an error vector, describing a shift between three-dimensional data, from patches reconstructed from corresponding encoded patches of the bitstream, and original data in the mesh representation, the patches being submeshes of the reconstructed three-dimensional mesh; signaling by the apparatus the error vector in or along with the bitstream; and transmitting by the apparatus the bitstream and the signaled error vector.

In an exemplary embodiment, a method is disclosed that includes receiving by an apparatus a bitstream and signaled patch correction vector elements in an error vector in or along with the bitstream, the bitstream comprising two-dimensional projections of a mesh representation of a three-dimensional object; performing by the apparatus a decoding process on the bitstream to at least form decoded two-dimensional projections of the mesh representation; reconstructing by the apparatus a three-dimensional mesh from decoded two-dimensional projections; applying by the apparatus the patch correction vector elements from the error vector either in the decoding process or the reconstructing; producing by the apparatus a modified three-dimensional mesh, as an output mesh, based at least on the application of the patch correction vector elements; and outputting by the apparatus the output mesh.

An additional exemplary embodiment includes a computer program, comprising instructions for performing the method of the previous paragraph, when the computer program is run on an apparatus. The computer program according to this paragraph, wherein the computer program is a computer program product comprising a computer-readable medium bearing the instructions embodied therein for use with the apparatus. Another example is the computer program according to this paragraph, wherein the program is directly loadable into an internal memory of the apparatus.

An exemplary apparatus includes one or more processors and one or more memories storing instructions that, when executed by the one or more processors, cause the apparatus at least to perform: receiving by an apparatus a bitstream and signaled patch correction vector elements in an error vector in or along with the bitstream, the bitstream comprising two-dimensional projections of a mesh representation of a three-dimensional object; performing by the apparatus a decoding process on the bitstream to at least form decoded two-dimensional projections of the mesh representation; reconstructing by the apparatus a three-dimensional mesh from decoded two-dimensional projections; applying by the apparatus the patch correction vector elements from the error vector either in the decoding process or the reconstructing; producing by the apparatus a modified three-dimensional mesh, as an output mesh, based at least on the application of the patch correction vector elements; and outputting by the apparatus the output mesh.

An exemplary computer program product includes a computer-readable storage medium bearing instructions that, when executed by an apparatus, cause the apparatus to perform at least the following: receiving by an apparatus a bitstream and signaled patch correction vector elements in an error vector in or along with the bitstream, the bitstream comprising two-dimensional projections of a mesh representation of a three-dimensional object; performing by the apparatus a decoding process on the bitstream to at least form decoded two-dimensional projections of the mesh representation; reconstructing by the apparatus a three-dimensional mesh from decoded two-dimensional projections; applying by the apparatus the patch correction vector elements from the error vector either in the decoding process or the reconstructing; producing by the apparatus a modified three-dimensional mesh, as an output mesh, based at least on the application of the patch correction vector elements; and outputting by the apparatus the output mesh.

In another exemplary embodiment, an apparatus comprises means for performing: receiving by an apparatus a bitstream and signaled patch correction vector elements in an error vector in or along with the bitstream, the bitstream comprising two-dimensional projections of a mesh representation of a three-dimensional object; performing by the apparatus a decoding process on the bitstream to at least form decoded two-dimensional projections of the mesh representation; reconstructing by the apparatus a three-dimensional mesh from decoded two-dimensional projections; applying by the apparatus the patch correction vector elements from the error vector either in the decoding process or the reconstructing; producing by the apparatus a modified three-dimensional mesh, as an output mesh, based at least on the application of the patch correction vector elements; and outputting by the apparatus the output mesh.

BRIEF DESCRIPTION OF THE DRAWINGS

In the attached Drawing Figures:

FIG. 9, which is spread over FIGS. 9A and 9B, is a logic flow diagram for V3C or other video-based coding patch correction vector determination and signaling, in accordance with an exemplary embodiment;

FIG. 10 is a block diagram of possible signaling for V3C or other video-based coding for correction vector elements, in accordance with exemplary embodiments; and FIG. 11 is a logic flow diagram for V3C or other video-based coding patch correction vector usage, in accordance with an exemplary embodiment.

DETAILED DESCRIPTION OF THE DRAWINGS

Figure 1A:
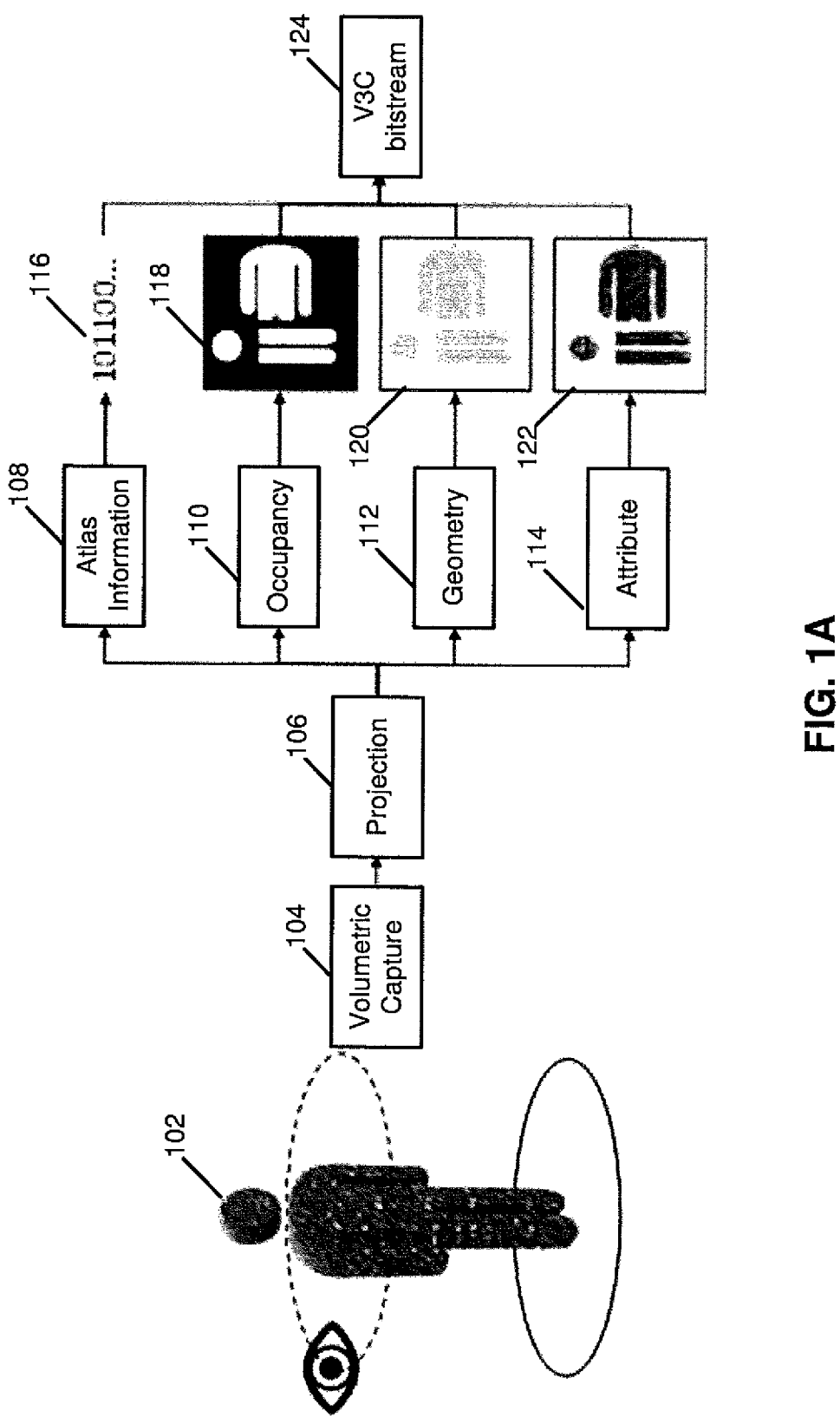
FIG. 1A is a diagram showing volumetric media conversion at an encoder side.

Abbreviations that may be found in the specification and/or the drawing figures are defined below, at the end of the detailed description section.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

When more than one drawing reference numeral, word, or acronym is used within this description with "/", and in general as used within this description, the "/" may be interpreted as "or", "and", or "both".

As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

The examples described herein relate to the encoding, signaling and rendering of a volumetric video that is based on mesh coding. Exemplary embodiments herein focus on methods improving the quality of reconstructed mesh surfaces in visual volumetric video-based coding. Exemplary embodiments disclose methods to improve quality of decoded mesh textures and geometry by using its hierarchical representation which in consequence increase compression efficiency of the encoding pipeline.

For ease of reference, the rest of this document is divided into sections. The section headings are merely exemplary and not intended to be limiting.

I. Introduction to Technological Area

This part has an introduction to the technological area.
I.A. Volumetric Video Data Volumetric video data represents a three-dimensional scene or object and can be used as input for AR, VR and MR applications. Such data describes geometry (e.g., shape, size, position in 3D-space) and respective attributes (e.g., color, opacity, reflectance, and the like), plus any possible temporal transformations of the geometry and attributes at given time instances (such as frames in 2D video). Volumetric video is either generated from 3D models, i.e., CGI, or captured from real-world scenes using a variety of capture solutions, e.g., multi-camera, laser scan, combination of video and dedicated depth sensors, and more. Also, a combination of CGI and real-world data is possible. Typical representation formats for such volumetric data are triangle meshes, point clouds, or voxels. Temporal information about the scene can be included in the form of individual capture instances, i.e., "frames" in 2D video, or other means, e.g., position of an object as a function of time.

Because volumetric video describes a 3D scene (or object), such data can be viewed from any viewpoint. Therefore, volumetric video is an important format for AR, VR, or MR applications, especially for providing 6DOF viewing capabilities.

Increasing computational resources and advances in 3D data acquisition devices have enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense voxel arrays have been used to represent volumetric medical data. In 3D graphics, polygonal meshes are extensively used. Point clouds on the other hand are well suited for applications such as capturing real world 3D scenes, where the topology is not necessarily a 2D manifold. Another way to represent 3D data is coding this 3D data as a set of textures and a depth map as is the case in the multi-view plus depth framework. Closely related to the techniques used in multi-view plus depth is the use of elevation maps, and multi-level surface maps.

I.B. MPEG Visual Volumetric Video-Based Coding (V3C)

Selected excerpts from the ISO/IEC 23090-5 Visual Volumetric Video-based Coding and Video-based Point Cloud Compression 2nd Edition standard are referred to herein.

Visual volumetric video, a sequence of visual volumetric frames, if uncompressed, may be represented by a large amount of data, which can be costly in teens of storage and transmission. This has led to the need for a high coding efficiency standard for the compression of visual volumetric data.

The V3C specification enables the encoding and decoding processes of a variety of volumetric media by using video and image coding technologies. This is achieved through first a conversion of such media from their corresponding 3D representation to multiple 2D representations, also referred to as V3C components, before coding such information. Such representations may include occupancy, geometry, and attribute components. The occupancy component can inform a V3C decoding and/or rendering system of which samples in the 2D components are associated with data in the final 3D representation. The geometry component contains information about the precise location of 3D data in space, while attribute components can provide additional properties, e.g., texture or material information, of such 3D data. An example is shown in FIG. 1A and FIG. 1B.

Figure 1B:
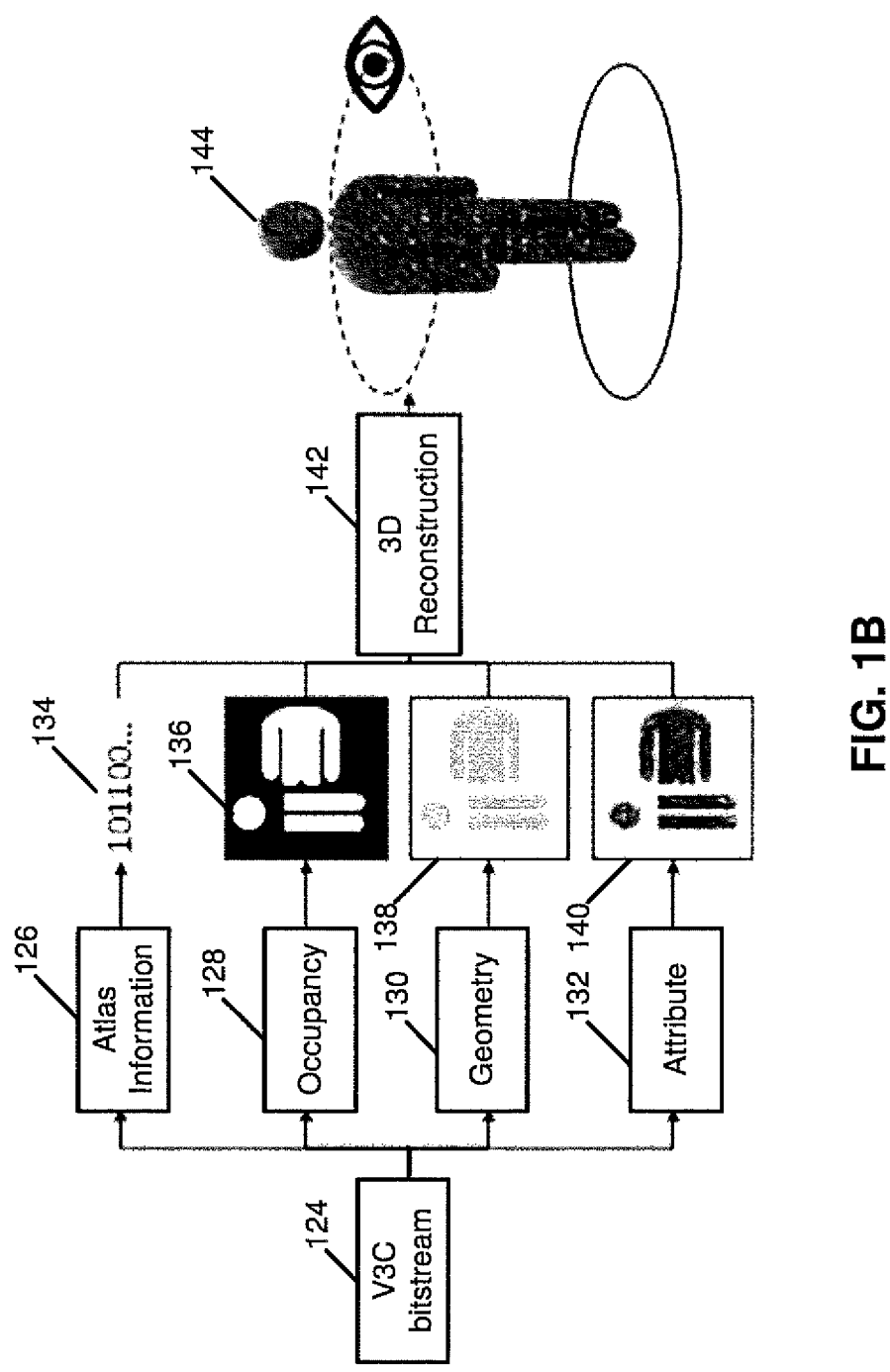
FIG. 1B is a diagram showing volumetric media reconstruction at a decoder side.

FIG. 1A shows volumetric media conversion at the encoder, and FIG. 1B shows volumetric media conversion at the decoder side. The 3D media 102 is converted to a series of 2D representations: occupancy 118, geometry 120, and attribute 122. Additional atlas information 108 is also included in the bitstream to enable inverse reconstruction. Refer to ISO/IEC 23090-5.

As further shown in FIG. 1A, a volumetric capture operation 104 generates a projection 106 from the input 3D media 102. In some examples, the projection 106 is a projection operation. From the projection 106, an occupancy operation 110 generates the occupancy 2D representation 118, a geometry operation 112 generates the geometry 2D representation 120, and an attribute operation 114 generates the attribute 2D representation 122. The additional atlas information 108 is included in the bitstream 116. The atlas information 108, the occupancy 2D representation 118, the geometry 2D representation 120, and the attribute 2D representation 122 are encoded into the V3C bitstream 124 to encode a compressed version of the 3D media 102.

As shown in FIG. 1B, a decoder using the V3C bitstream 124 derives 2D representations using an occupancy operation 128, a geometry operation 130 and an attribute operation 132. The atlas information operation 126 provides atlas information into a bitstream 134. The occupancy operation 128 derives the occupancy 2D representation 136, the geometry operation 130 derives the geometry 2D representation 138, and the attribute operation 132 derives the attribute 2D representation 140. The 3D reconstruction operation 142 generates a decompressed reconstruction 144 of the 3D media 102, using the atlas information 126/134, the occupancy 2D representation 136, the geometry 2D representation 138, and the attribute 2D representation 140.

Additional information that allows associating all these subcomponents and enables the inverse reconstruction, from a 2D representation back to a 3D representation, is also included in a special component, referred to herein as the atlas. An atlas includes multiple elements, namely patches. Each patch identifies a region in all available 2D components and contains information necessary to perform the appropriate inverse projection of this region back to the 3D space. The shape of such regions is determined through a 2D bounding box associated with each patch as well as their coding order. The shape of these regions is also further refined after the consideration of the occupancy information.

Figure 2:
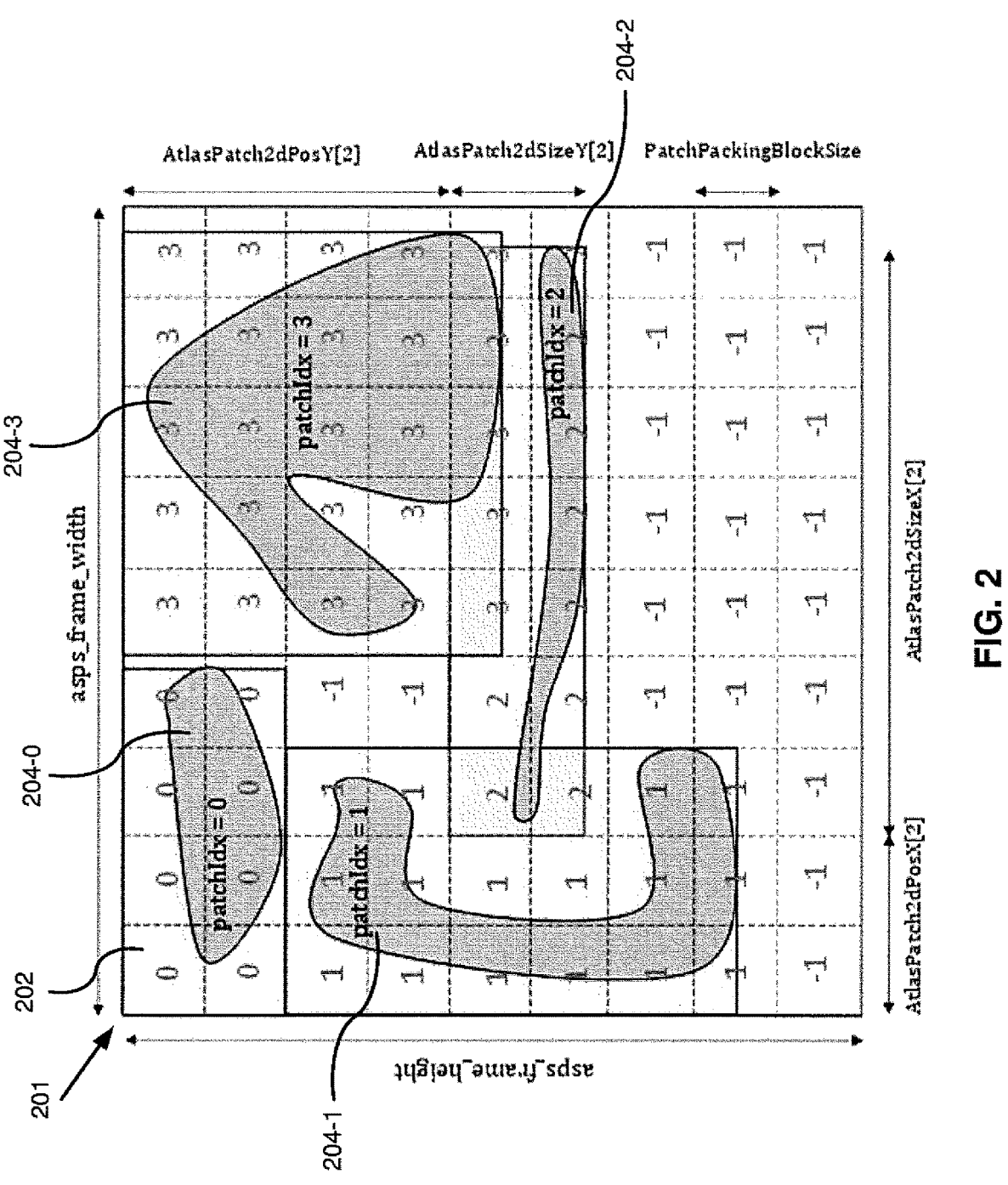
FIG. 2 shows an example of block to patch mapping.

Atlases are partitioned into patch-packing blocks of equal size. Refer for example to block 202 in FIG. 2, where FIG. 2 shows an example of block to patch mapping. The 2D bounding boxes of patches and their coding order determine the mapping between the blocks of the atlas image and the patch indices. FIG. 2 shows an example of block to patch mapping with 4 projected patches (204-0, 204-1, 204-2, 204-3) onto an atlas 201 when asps_patch_precedence_order_flag is equal to 0. Projected points are represented with dark gray. The area that does not contain any projected points is represented with light grey. Patch packing blocks 202 are represented with dashed lines. The number inside each patch packing block 202 represents the patch index of the patch (204-0, 204-1, 204-2, 204-3) to which it is mapped.

Axes orientations are specified for internal operations. For instance, the origin of the atlas coordinates is located on the top-left corner of the atlas frame. For the reconstruction step, an intermediate axes definition for a local 3D patch coordinate system is used. The 3D local patch coordinate system is then converted to the final target 3D coordinate system using appropriate transformation steps.

Figures 3A, 3B, 3C:
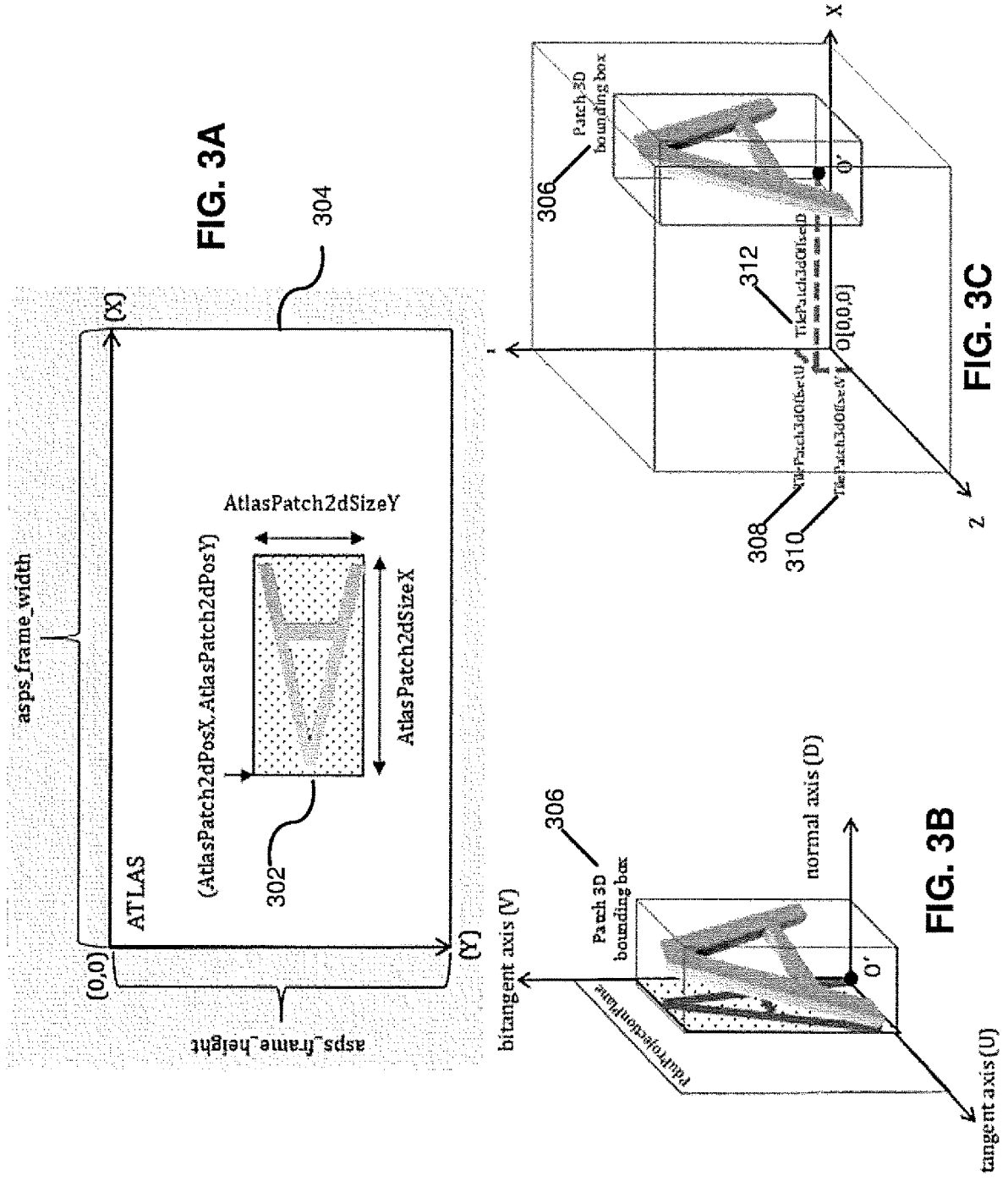
FIG. 3A shows an example of an atlas coordinate system.
FIG. 3B shows an example of a local 3D patch coordinate system.
FIG. 3C shows an example of a final target 3D coordinate system.

FIG. 3A shows an example of an atlas coordinate system, FIG. 3B shows an example of a local 3D patch coordinate system, and FIG. 3C shows an example of a final target 3D coordinate system. Refer to ISO/IEC 23090-5.

FIG. 3A shows an example of a single patch 302 packed onto an atlas image 304. This shows the beginning X and Y locations (AtlasPatch2sPosX and AtlasPatch2sPosY, respectively) and sizes in the X and Y dimensions (AtlasPatch2dSizeX and AtlasPatch2dSizeY, respectively). This patch 302 is then converted, with reference to FIG. 3B, to a local 3D patch coordinate system (U, V, D) defined by the projection plane with origin O', tangent (U), bi-tangent (V), and normal (D) axes. For an orthographic projection, the projection plane is equal to the sides of an axis-aligned 3D bounding box 306, as shown in FIG. 3B. The location of the bounding box 306 in the 3D model coordinate system, defined by a left-handed system with axes (X, Y, Z), can be obtained by adding offsets TilePatch3dOffsetU 308, TilePatch3DOffsetV 310, and TilePatch3DOffsetD 312, as illustrated in FIG. 3C.

I.C. V3C High Level Syntax

Coded V3C video components are referred to herein as video bitstreams, while an atlas component is referred to as the atlas bitstream. Video bitstreams and atlas bitstreams may be further split into smaller units, referred to herein as video and atlas sub-bitstreams, respectively, and may be interleaved together, after the addition of appropriate delimiters, to construct a V3C bitstream.

V3C patch information is contained in an atlas bitstream, atlas_sub_bitstream( ), which contains a sequence of NAL units. A NAL unit is specified to format data and provide header information in a manner appropriate for conveyance on a variety of communication channels or storage media. All data are contained in NAL units, each of which contains an integer number of bytes. A NAL unit specifies a generic format for use in both packet-oriented and bitstream systems. The format of NAL units for both packet-oriented transport and sample streams is identical, except that in the sample stream format specified in Annex D of ISO/IEC 23090-5, each NAL unit can be preceded by an additional element that specifies the size of the NAL unit.

NAL units in an atlas bitstream can be divided into atlas coding layer (ACL) and non-atlas coding layer (non-ACL) units. The former is dedicated to carry patch data, while the latter is dedicated to carry data necessary to properly parse the ACL units or any additional auxiliary data.

In the nal_unit_header( ) syntax, nal_unit_type specifies the type of the RBSP data structure contained in the NAL unit as specified in Table 4 of ISO/IEC 23090-5. nal_layer_id specifies the identifier of the layer to which an ACL NAL unit belongs or the identifier of a layer to which a non-ACL NAL unit applies. The value of nal_layer_id shall be in the range of 0 to 62, inclusive. The value of 63 may be specified in the future by ISO/IEC. Decoders conforming to a profile specified in Annex A of ISO/IEC 23090-5 shall ignore (i.e., remove from the bitstream and discard) all NAL units with values of nal_layer_id not equal to 0.

I.D. V3C Extension Mechanisms

While designing the V3C specification, it was envisaged that amendments or new editions can be created in the future. In order to ensure that the first implementations of V3C decoders are compatible with any future extension, a number of fields for future extensions to parameter sets were reserved.

For example, the second edition of V3C introduced an extension in VPS related to MIV and the packed video component, as shown below, where the right column is a column of descriptors:

```
...
  vps_extension_present_flag                          u(1)
  if( vps_extension_present_flag ) {
    vps_packing_information_present_flag               u(1)
    vps_miv_extension_present_flag                     u(1)
    vps_extension_6bits                                u(6)
  }
```

-continued

```
  if( vps_packing_information_present_flag ) {
    for( k = 0 ; k <= vps_atlas_count_minus1; k++ ) {
      j = vps_atlas_id[ k ]
      vps_packed_video_present_flag[ j ]
      if( vps_packed_video_present_flag[ j ] )
        packing_information( j )
    }
  }
  if( vps_miv_extension_present_flag )
    vps_miv_extension( ) /*Specified in ISO/IEC 23090-12 */
  if( vps_extension_6bits ) {
    vps_extension_length_minus1                        ue(v)
    for( j = 0; j < vps_extension_length_minus1 + 1; j++ ) {
      vps_extension_data_byte                          u(8)
    }
  }
  byte_alignment( )
}
```

I.E. Rendering and Meshes

A polygon mesh is a collection of vertices, edges and faces that defines the shape of a polyhedral object in 3D computer graphics and solid modeling. The faces usually consist of triangles (triangle mesh), quadrilaterals (quads), or other simple convex polygons (n-gons), since this simplifies rendering, but may also be more generally composed of concave polygons, or even polygons with holes.

Figure 4:
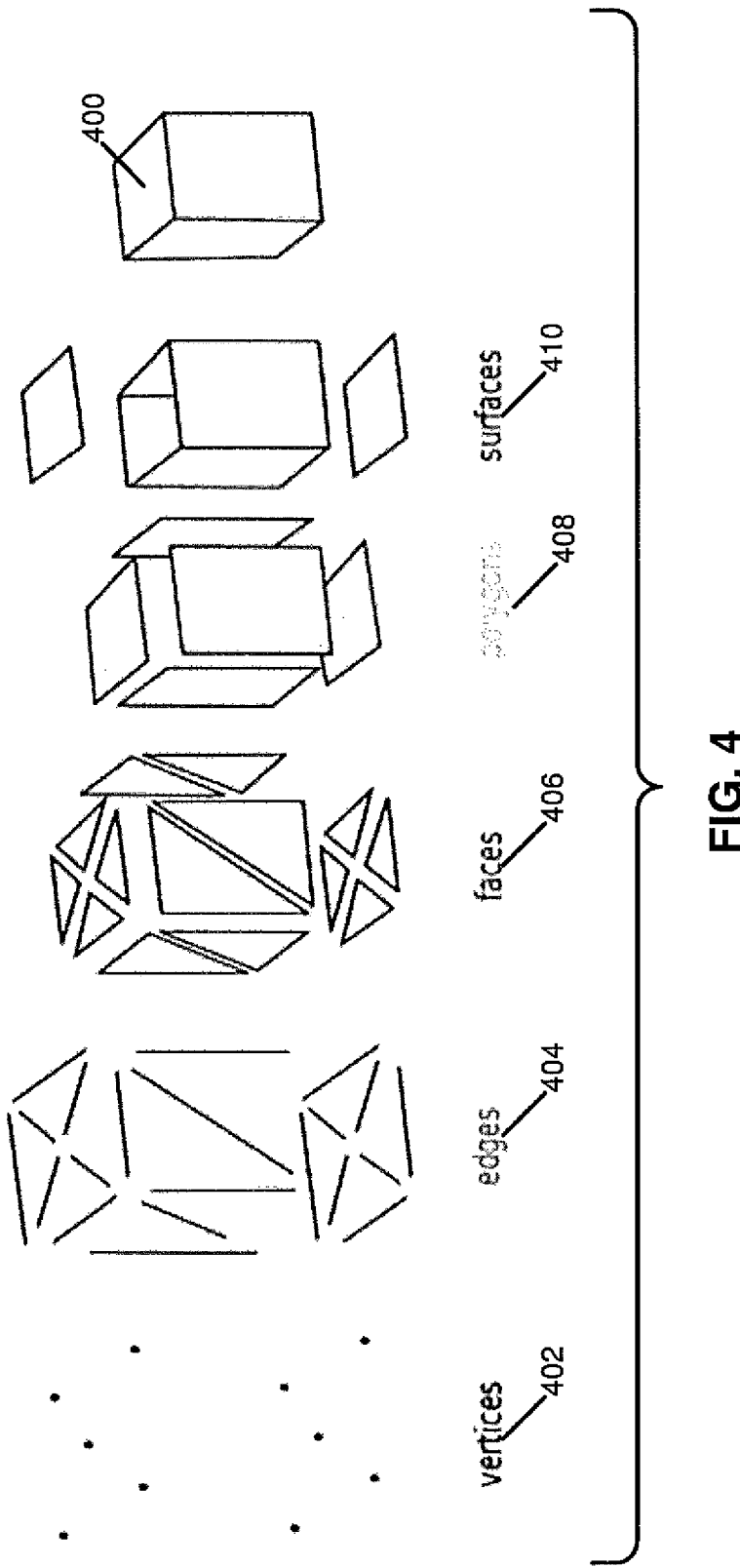
FIG. 4 shows elements of a mesh.

With reference to FIG. 4, objects 400 created with polygon meshes are represented by different types of elements. These include vertices 402, edges 404, faces 406, polygons 408 and surfaces 410 as shown in FIG. 4. Thus, FIG. 4 illustrates elements of a mesh.

Polygon meshes are defined by the following elements.

Vertex (402): a position in 3D space defined as (x,y,z) along with other information such as color (r,g,b), normal vector and texture coordinates.

Edge (404): a connection between two vertices.

Face (406): a closed set of edges 404, in which a triangle face has three edges, and a quad face has four edges. A polygon 408 is a coplanar set of faces 406. In systems that support multi-sided faces, polygons and faces are equivalent. Mathematically, a polygonal mesh may be considered an unstructured grid, or undirected graph, with additional properties of geometry, shape and topology.

Surfaces (410): or smoothing groups, are useful, but not required to group smooth regions.

Groups: some mesh formats contain groups, which define separate elements of the mesh, and are useful for determining separate sub-objects for skeletal animation or separate actors for non-skeletal animation.

Materials: defined to allow different portions of the mesh to use different shaders when rendered.

UV coordinates: most mesh formats also support some form of UV coordinates, which are a separate 2D representation of the mesh "unfolded" to show what portion of a 2-dimensional texture map to apply to different polygons of the mesh. It is also possible for meshes to contain other such vertex attribute information such as color, tangent vectors, weight maps to control animation, and the like (sometimes also called channels).

I.F. V-PCC Mesh Coding Extension (MPEG M49588)

Figure 5:
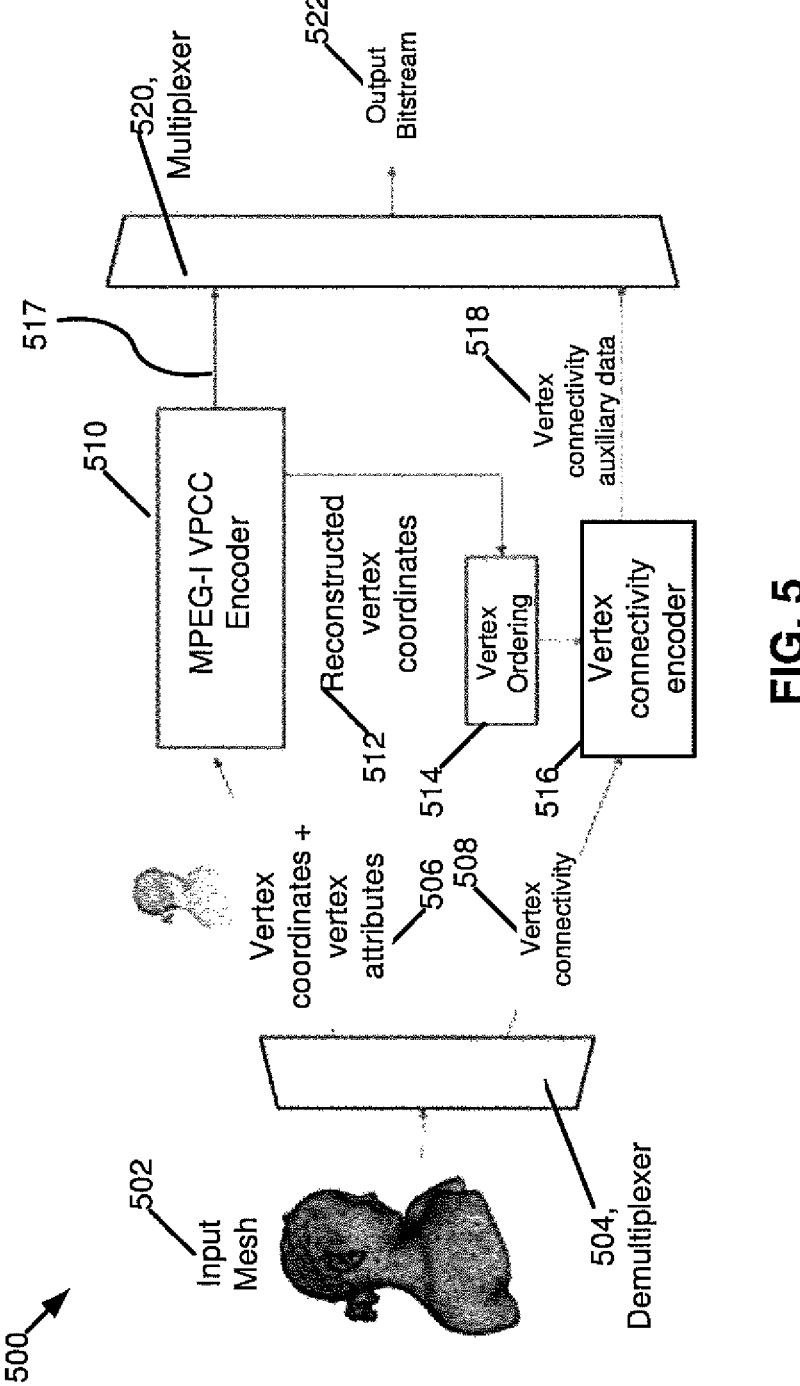
FIG. 5 shows an example V-PCC extension for mesh encoding, based on the embodiments described herein.
Figure 6:
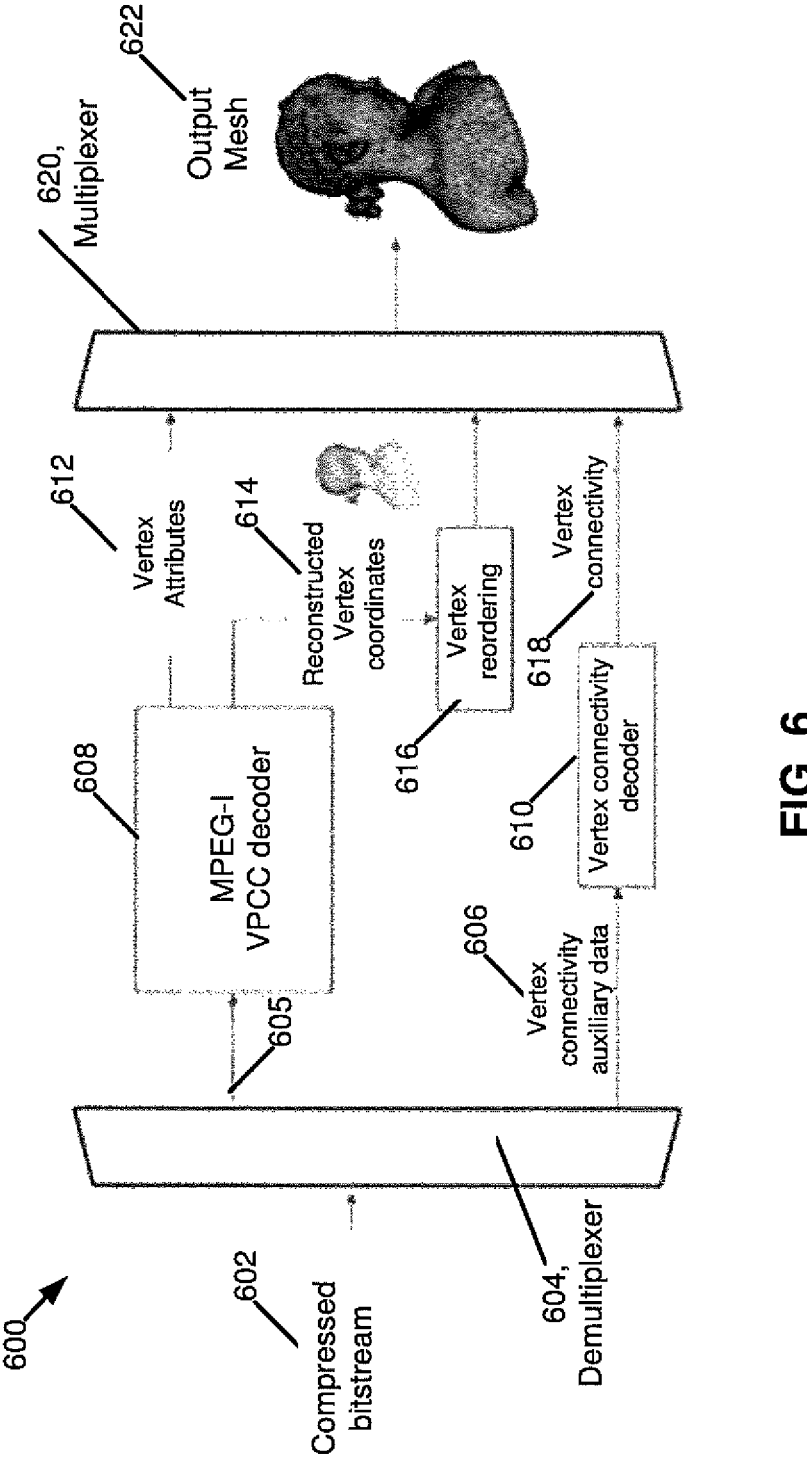
FIG. 6 shows an example V-PCC extension for mesh decoding, based on the embodiments described herein.

FIGS. 5 and 6 show the extensions to the V-PCC encoder and decoder to support mesh encoding and mesh decoding, respectively, as proposed in MPEG input document [MPEG M47608].

In FIG. 5, in the encoder extension (e.g., encoder 500), the input mesh data 502 is demultiplexed with demultiplexer 504 into vertex coordinates+attributes 506 and vertex connectivity 508. The vertex coordinates+attributes data 506 is coded using MPEG-I V-PCC (such as with MPEG-I VPCC encoder 510), whereas the vertex connectivity data 508 is coded (using vertex connectivity encoder 516) as auxiliary data 518. Both of these (encoded vertex coordinates and vertex attributes 517 and auxiliary data 518) are multiplexed using multiplexer 520 to create the final compressed output bitstream 522. Vertex ordering 514 is carried out on the reconstructed vertex coordinates 512 at the output of MPEG-I V-PCC encoder 510 to reorder the vertices for optimal vertex connectivity encoding via encoder 516.

As shown in FIG. 6, in the decoder 600, the input compressed bitstream 602 is demultiplexed with demultiplexer 604 to generate the compressed bitstreams for vertex coordinates+attributes data 605 and vertex connectivity auxiliary data 606. The input compressed bitstream 602 may comprise or may be the output from the encoder 500, namely the output bitstream 522 of FIG. 5. The vertex coordinates+attributes data 605 is decompressed using MPEG-I V-PCC decoder 608 to generate vertex attributes 612. Vertex reordering 616 is carried out on the reconstructed vertex coordinates 614 at the output of MPEG-I V-PCC decoder 608 to match the vertex order at the encoder 500. The vertex connectivity auxiliary data 606 is also decompressed using vertex connectivity decoder 610 to generate vertex connectivity information 618, and everything (including vertex attributes 612, the output of vertex reordering 616, and vertex connectivity information 618) is multiplexed with multiplexer 620 to generate the reconstructed mesh 622.

I.G. Generic Mesh Compression

Mesh data may be compressed directly without projecting it into 2D-planes, as in V-PCC based mesh coding. In fact, the anchor for V-PCC mesh compression call for proposals (CfP) utilizes off-the shelf mesh compression technology, Draco (found at google.github.io/draco/) is an open-course library for compressing mesh data excluding textures. Draco is used to compress vertex positions in 3D, connectivity data (faces) as well as UV coordinates. Additional per-vertex attributes may be also compressed using Draco. The actual UV texture may be compressed using traditional video compression technologies, such as H.265 or H.264.

Draco uses the edgebreaker algorithm at its core to compress 3D mesh information. Draco offers a good balance between simplicity and efficiency, and is part of Khronos endorsed extensions for the gITF specification. The main idea of the algorithm is to traverse mesh triangles in a deterministic way so that each new triangle is encoded next to an already encoded triangle. This enables prediction of vertex specific information from the previously encoded data by simply adding delta to the previous data. Edgebreaker utilizes symbols to signal how each new triangle is connected to the previously encoded part of the mesh. Connecting triangles in such a way results on average in 1 to 2 bits per triangle when combined with existing binary encoding techniques.

I.H. Exemplary Issues in the Conventional Technology

MPEG 3DG (ISO/IEC SC29 WG7) has issued call for proposal (CfP) on integration of MESH compression into the V3C family of standards (ISO/IEC 23090-5). The inventors have identified that the process of creating 2D patches from 3D data, followed by video encoding, and then reconstruction back to 3D space, may lead to small shifts of the reconstructed 3D mesh data, when compared to its original.

Such shifts result from quantization errors introduced in the V3C processing chain, such as the following:

1) quantization due to insufficient bit depth for the geometry picture;
2) quantization due to insufficient resolution of the geometry or texture image;
3) sub-sampling of the original geometry of texture information;
4) Intra- and inter-frame video coding artefacts introduced by compression of picture data;
5) insufficient precision of the V3C patch metadata, describing the patch location in 3D space; and/or
6) floating point input data.

Figure 7:
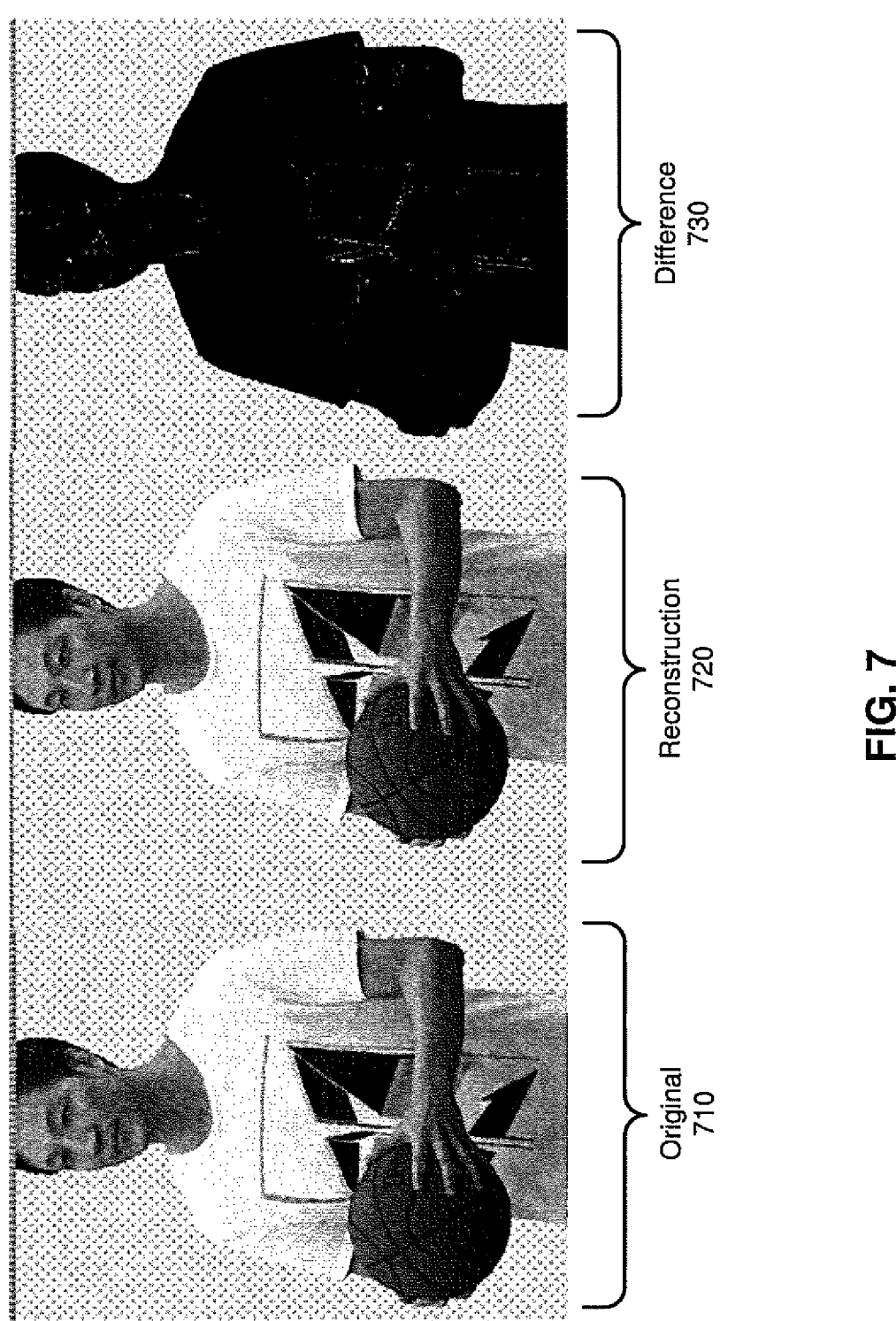
FIG. 7 is used to illustrate errors in encoding and decoding and includes the following pictures: Original (left), reconstructed (middle), difference (right)

Often such shifts are hard to detect visually, as visualized in FIG. 7. FIG. 7 is used to illustrate errors in encoding and decoding and includes the following pictures: Original (left), reconstructed (middle), difference (right). While the errors are not extensive, they yield large error vectors if compared against the original. These errors lead to low objective quality scores.

Such objective quality scores are used in the encoder to decide the best rate-distortion distribution, also called rate-distortion optimization (RDO). Thus, having such small shifts affect the encoder performance negatively.

ISO/IEC 23090-5 does not support per-patch signaling of patch precision. Only tile level signaling is supported, such as ath_pos_min_d_quantizer, which is provided in atlas_tile_header( ). Furthermore, there is no adaptive signaling for patch precision for all reconstructed coordinate axes, just in the no mal direction of the patch.

II. Exemplary Implementation Details

The exemplary embodiments disclose additional signaling to the V3C or other bitstream, to counteract any possible shifts of a V3C patch compared to its original location. Benefits of the signaling include, for example, one or more of the following:

1) Improved objective metric scores for V3C mesh reconstruction;
2) Support for valid V3C mesh encoder rate-distortion optimization; and
3) Allowance for floating point corrections of the 3D reconstruction.

II.A. Exemplary Apparatus

Figure 8:
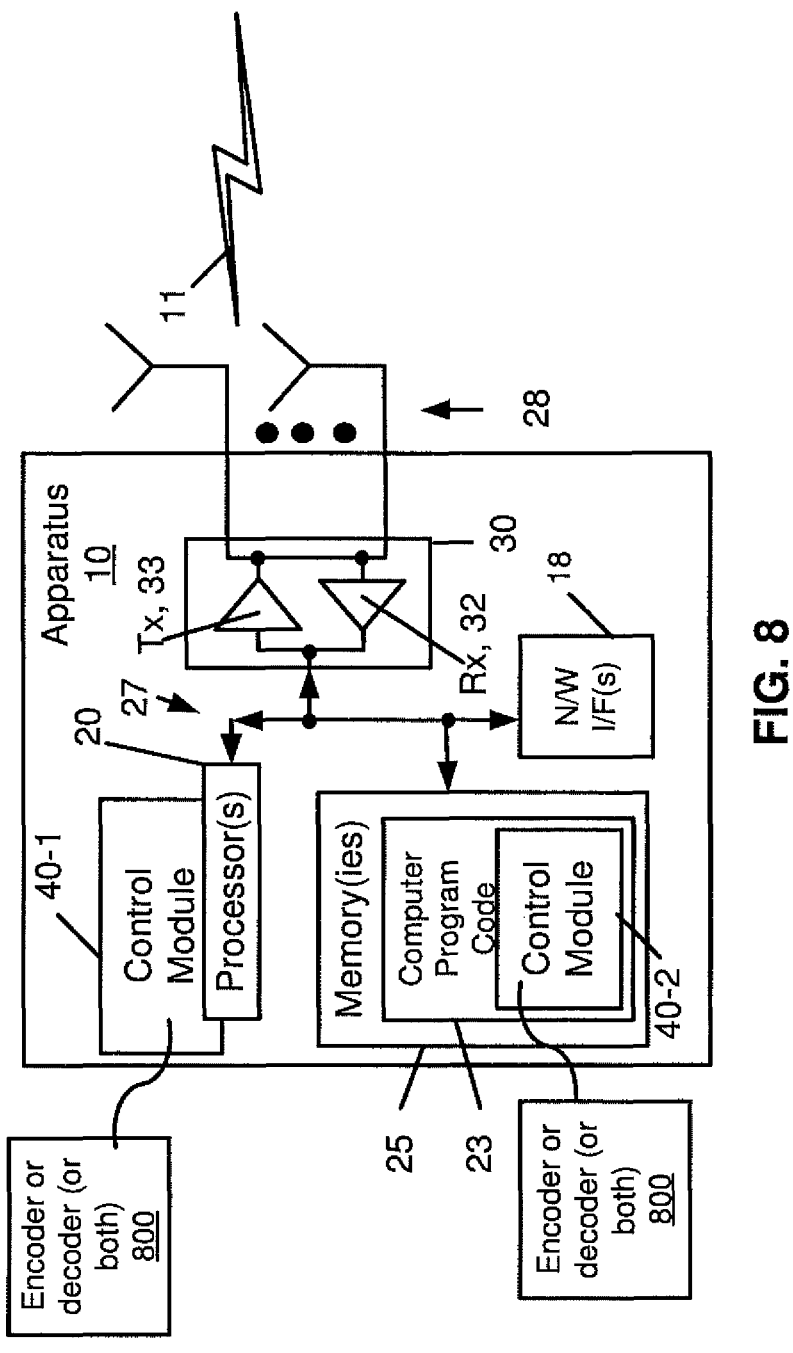
FIG. 8 is a block diagram of an apparatus that may be used for encoding or decoding, in accordance with an exemplary embodiment.

Turning to FIG. 8, this figure is a block diagram of an apparatus that may be used for encoding or decoding, in accordance with an exemplary embodiment. Apparatus 10 may implement modified versions of encoder 500 of FIG. 5 or decoder 600 of FIG. 6, for instance. Apparatus 10 may be used to provide an encoder 800 or a decoder 800 in accordance with exemplary embodiments herein. As such, a modified version of the V-PCC extension for mesh encoding of FIG. 5 or mech decoder of FIG. 6 may be used. The apparatus 10 includes circuitry comprising one or more processors 20, one or more memories 25, one or more transceivers 30, and one or more network (N/W) interfaces (I/Fs) 18 interconnected through one or more buses 27. Each of the one or more transceivers 30 includes a receiver, Rx, 32 and a transmitter, Tx, 33. The one or more buses 27 may be address, data, or control buses, and may include any interconnection mechanism, such as a series of lines on a motherboard or integrated circuit, fiber optics or other optical communication equipment, and the like. The one or more transceivers 30 are connected to one or more antennas 28. The one or more antennas 28 may communicate via wireless link(s) 11.

The N/W I/F(s) 18 may be "wired" network interfaces, such as USB (universal serial bus) or Ethernet or optical network interfaces, depending on the apparatus 10. The apparatus 10 may be wireless, having one or more of the transceivers 30, wired, having one or more N/W I/F(s) 18, or both.

The one or more memories 25 include computer program code 23. The apparatus 10 includes a control module 40, comprising one of or both parts 40-1 and/or 40-2, which may be implemented in a number of ways. The control module 40 may be implemented in hardware as control module 40-1, such as being implemented as part of the one or more processors 20. The control module 40-1 may be implemented also as an integrated circuit or through other hardware such as a programmable gate array. In another example, the control module 40 may be implemented as control module 40-2, which is implemented as computer program code 23 and is executed by the one or more processors 20. For instance, the one or more memories 25 and the computer program code 23 may be configured to, with the one or more processors 20, cause the apparatus 10 to perform one or more of the operations as described herein. The encoder 800 or decoder 800 (or both) may be implemented in the control module 40-1, 40-2, or both 40-1 and 40-2.

The computer readable memories 25 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 25 may be means for performing storage functions. The processors 20 may be of any type suitable to the local technical environment, and may include one or more of general-purpose computers, special purpose computers, microprocessors, digital signal processors (DSPs) and processors based on a multi-core processor architecture, as non-limiting examples. The processors 20 may be means for performing functions, such as controlling an entity to perform functions as described herein. The processors 20 and memories 25 may be distributed, such as in a cloud environment, or may be "singular" such as being contained in one contained set of circuitry (such as a rack server, wireless communication device, computer system, and the like).

II.B. Exemplary Encoder Embodiments

Figures 9, 9A:
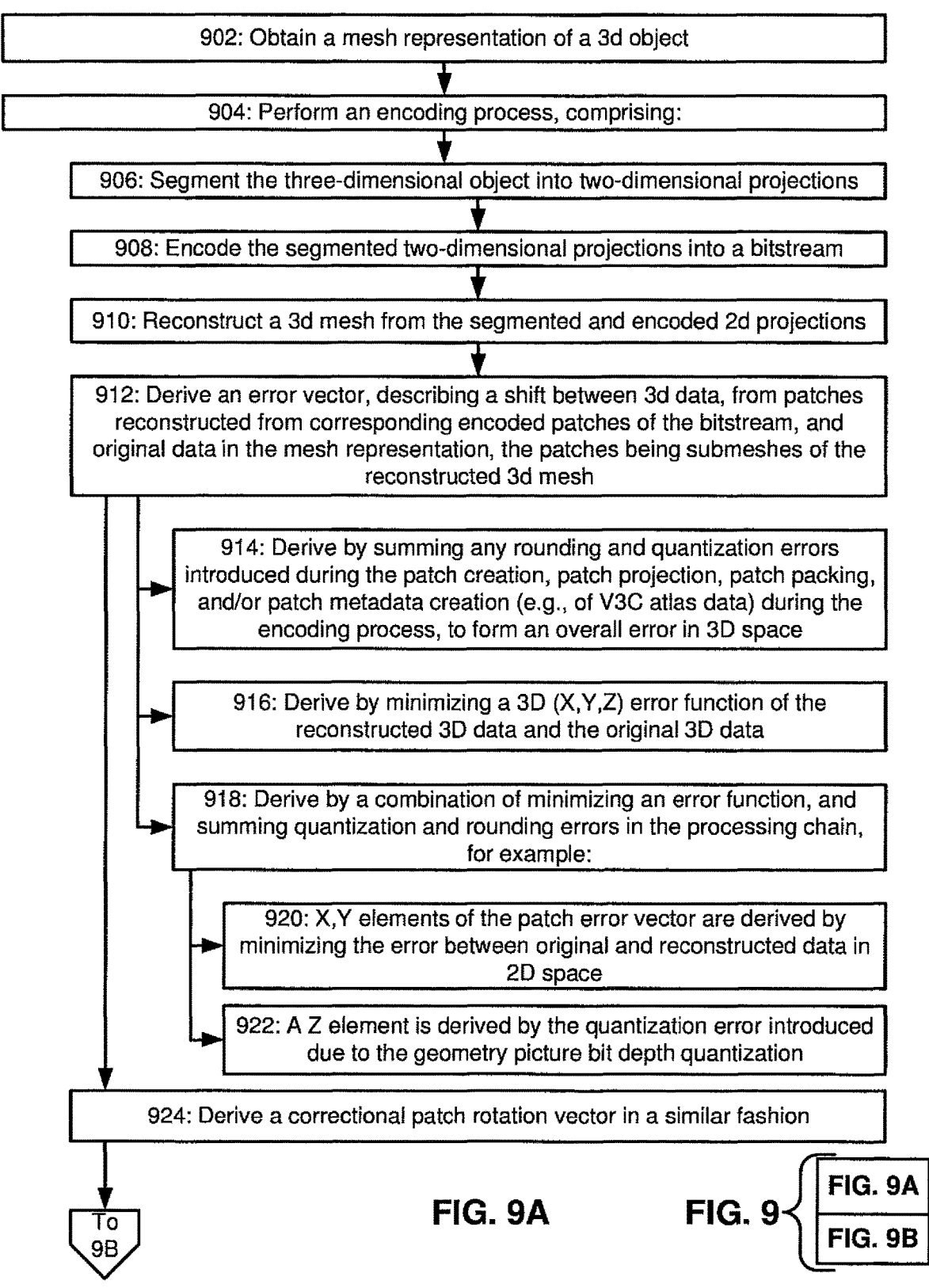

This section describes an exemplary encoder embodiment. This is described mainly with reference to FIG. 9, which is spread over FIGS. 9A and 9B, and is a logic flow diagram for V3C or other video-based coding patch correction vector signaling, in accordance with an exemplary embodiment. FIG. 9 further illustrates the operation of an exemplary method, a result of execution of computer program instructions embodied on a computer readable memory, functions performed by logic implemented in hardware, and/or interconnected means for performing functions in accordance with an exemplary embodiment. The blocks in FIG. 9 may be performed by an apparatus 10, e.g., under control of the control module 40 as implemented via an encoder 800. It is noted that the primary examples use V3C, but other video-based coding may be used. The patch correction vector typically includes location correction information, but may also or alternatively include rotation location correction information.

In block 920, the apparatus 10 obtains a mesh representation of a 3d object. An encoding process is performed (block 904), which is comprises of multiple blocks. In block 906, the apparatus segments the three-dimensional object into two-dimensional projections. The apparatus encodes the segmented two-dimensional projections into a bitstream in block 908 and reconstructs a 3d mesh from the segmented and encoded 2d projections in block 910. Note that the encoding encodes information for patch data units, each patch data unit corresponding to at least one patch and containing information to describe that at least one patch.

In one embodiment, a 3D error vector is derived at the encoder, describing the shift between 3D data reconstructed from an encoded V3C patch and the original data (the input). Such a vector could be called V3C patch location correction vector. The patches are submeshes of the reconstructed 3d mesh. The patch location correction vector may have three elements (e.g., based on x, y, and z or other coordinate system), describing a shift (in geometry), applied to the primitives generated from the respective V3C patch after reconstruction, but before post-processing and rendering.

In one embodiment, such a vector may be derived (see block 914) by summing any rounding and quantization errors introduced during the patch creation, patch projection, patch packing, and/or patch metadata creation (e.g., of V3C atlas data) during the encoding process, to form an overall error in 3D space.

In another embodiment, such a vector may be derived by minimizing a 3D (X,Y,Z) error function of the reconstructed 3D data and the original 3D data. See block 916. Note the data may be in corresponding meshes.

In yet another embodiment, such a vector may be derived (see block 918) by a combination of minimizing an error function, and summing quantization and rounding errors in the processing chain, for example:

1) X,Y elements of the patch error vector are derived by minimizing the error between original and reconstructed data in 2D space (much faster than operations in 3D), see block 920; and/or 2) A Z element is derived by the quantization error introduced due to the geometry picture bit depth quantization, see block 922.

Other combinations are also feasible.

In yet another embodiment, in addition to the translational V3C patch location correction vector, a correctional patch rotation vector may be derived in similar fashion. See block 924. The correctional patch rotation vector applies a rotation, e.g., in 3D space, to the patch.

It is also possible to determine other information corresponding to the error vector. See block 925. For instance, as described in more detail below, precision of the correction error vector (e.g., on a per-patch basis) may be determined and revised. This corresponding information can be sent along with the error vector.

In block 926, the apparatus 10 signals the error vector (e.g., and other information as in block 925, if determined) in or along with the bitstream. The apparatus 10 transmits the signaled error vector and corresponding bitstream in block 928.

II.C. Exemplary V3C Signaling Embodiments

FIG. 10 is a block diagram of possible signaling for V3C or other video-based coding for location correction vector elements, in accordance with exemplary embodiments. While V3C is the primary example used, the signaling may be applied to other video-based coding. It is also noted that the indications for the patch correction vector are typically applied on and are included on a per-patch basis, although this is only an example.

In one embodiment, the V3C patch location correction vector is signaled in or along with a V3C bit stream. See block 1002. For example, as described as follows, using the ISO/IEC 23090-5 (V3c)–8.3.7.3 patch data unit (pdu) syntax, where a pdu has information to describe at least one patch:

|  | Descriptor |
|---|---|
| patch_data_unit( tileID, patchIdx ) { |  |
|   pdu_2d_pos_x[ tileID ][ patchIdx ] | ue(v) |
|   pdu_2d_pos_y[ tileID ][ patchIdx ] | ue(v) |
|   pdu_2d_size_x_minus1[ tileID ][ patchIdx ] | ue(v) |
|   pdu_2d_size_y_minus1[ tileID ][ patchIdx ] | ue(v) |
|   pdu_3d_offset_u[ tileID ][ patchIdx ] | u(v) |
|   pdu_3d_offset_v[ tileID ][ patchIdx ] | u(v) |
|   pdu_3d_offset_d[ tileID ][ patchIdx ] | u(v) |
|   pdu_3d_corr_vec_flag[ tileID ][ patchIdx ] { | u(1) |
|     pdu_3d_corr_vec_x[ tileID ][ patchIdx ] | ue(v) |
|     pdu_3d_corr_vec_y [ tileID ][ patchIdx ] | ue(v) |
|     pdu_3d_corr_vec_z [ tileID ][ patchIdx ] | ue(v) |
|   } |  |
|   if( asps_normal_axis_max_delta_value_enabled_flag ) |  |
|     pdu_3d_range_d[ tileID ][ patchIdx ] | u(v) |
|   pdu_projection_id[ tileID ][ patchIdx ] | u(v) |
|   pdu_orientation_index[ tileID ][ patchIdx ] | u(v) |
|   if( afps_lod_mode_enabled_flag ) { |  |
|     pdu_lod_enabled_flag[ tileID ][ patchIdx ] | u(1) |
|     if( pdu_lod_enabled_flag[ tileID ][ patchIdx ] ) { |  |
|       pdu_lod_scale_x_minus1[ tileID ][ patchIdx ] | ue(v) |
|       pdu_lod_scale_y_idc[ tileID ][ patchIdx ] | ue(v) |
|     } |  |
|   } |  |
|   if( asps_plr_enabled_flag ) |  |
|     plr_data( tileID, patchIdx ) |  |
|   if( asps_miv_extension_present_flag ) |  |
|     pdu_miv_extension( tileID, patchIdx ) /* Specified in ISO/IEC 23090-12 */ |  |
| } |  |

The variables may be described as follows, in exemplary embodiments.

The pdu_3d_corr_vec_flag[tileID][p] being equal to 1 specifies that a V3C patch location correction vector is present for the current patch p of the current atlas tile, with tile ID equal to tileID. If pdu_3d_corr_vec_flag [tileID][p] is equal to 0, no V3C patch location correction vector is present for the current patch. If pdu_3d_corr_vec_flag [tileID][p] is not present, its value should be inferred to be equal to 0.

The pdu_3d_corr_vec_x [tileID][p] specifies the shift to be applied to the reconstructed patch points in a patch with index p of the current atlas tile, with tile ID equal to tileID, along the tangent axis (X). The value of pdu_3d_corr_vec_x [tileID][p] is, in an exemplary embodiment, in the range of −4 to 4, inclusive. The number of bits used to represent pdu_3d_corr_vec_x [tileID][p] is 8 in an exemplary embodiment, though not limited to this.

The pdu_3d_corr_vec_y [tileID][p] specifies the shift to be applied to the reconstructed patch points in a patch with index p of the current atlas tile, with tile ID equal to tileID, along the bi-tangent axis (Y).

The value of pdu_3d_corr_vec_y [tileID][p] should be in the range of −4 to 4, inclusive, in an exemplary embodiment, though this is not limiting. The number of bits used to represent pdu_3d_corr_vec_y [tileID][p] is 8 in an exemplary embodiment, though not limited to this.

The pdu_3d_corr_vec_z [tileID][p] specifies the shift to be applied to the reconstructed patch points in patch with index p of the current atlas tile, with tile ID equal to tileID, along the normal axis (Z).

The value of pdu_3d_corr_vec_z [tileID][p] should be in the range of −4 to 4, inclusive, in a non-limiting embodiment. The number of bits used to represent pdu_3d_corr_vec_z [tileID][p] is 8, in a non-limiting embodiment.

In another embodiment, indication of the precision and/or range of the V3C patch (e.g., location) correction vector is signaled as well. See block 1004. As part of an atlas sequence parameter set (asps or ASPS) or atlas frame parameter set (AFPS or afps) in a dedicated extension syntax, this may be signaled as follows (where the right column indicates descriptors):

|  | Descriptor |
|---|---|
| asps_extension_present_flag | u(1) |
| if( asps_extension_present_flag ) { |  |
|   asps_vpcc_extension_present_flag | u(1) |
|   asps_miv_extension_present_flag | u(1) |
|   asps_mesh_extension_present_flag | u(1) |
|   asps_extension_5bits | u(5) |
| } |  |
| if( asps_vpcc_extension_present_flag ) |  |
|   asps_vpcc_extension( ) /* Specified in Annex H */ |  |
| if( asps_miv_extension_present_flag ) |  |
|   asps_miv_extension( ) /* Specified in ISO/IEC 23090-12 */ |  |
| if( asps_mesh_extension_present_flag ) |  |
|   asps_mesh_extension ( ) |  |
| if( asps_extension_5bits ) |  |
|   while( more_rbsp_data( ) ) |  |
|     asps_extension_data_flag | u(1) |
| rbsp_trailing_bits( ) |  |
| } |  |

The asps_mesh_extension_present_fiag being equal to 1 specifies that the asps_mesh_extension( ) syntax structure is present in the atlas_sequence_parameter_set( ) syntax structure, in an exemplary but non-limiting embodiment. The asps_mesh_extension_present_flag equal to 0 specifies that this syntax structure is not present in this embodiment.

|  | Descriptor |
|---|---|
| asps_mesh_extension ( ) { |  |
|   asps_geometry_error_vec_range | u(5) |
|   asps_geometry_error_vec_precision | u(4) |

The asps_geometry_error_vec_range plus 1 indicates the range of the V3C patch location error vector in negative and positive values, in a non-limiting embodiment. The asps_geometry_error_vec_range is in the range of 0 to 31, inclusive for this embodiment.

The asps_geometry_error_vec_precision plus 1 indicates the precision of the V3C patch location error vector in bits, in an exemplary embodiment, though this is not limiting. The asps_geometry_error_vecprecision is in the range of 0 to 15, inclusive, in this exemplary embodiment.

In another embodiment, the semantics of the previous embodiment (where the V3C patch correction vector is signaled in or along with a V3C bit stream) would be adapted to the following.

The pdu_3d_corr_vec_x [ tileID][p] specifies the shift to be applied to the reconstructed patch points in patch with index p of the current atlas tile, with tile ID equal to tileID, along the tangent axis (X). The value of pdu_3d_corr_vec_x [tileID][p] is in the range of −(asps_geometry_error_vec_range+1) to (asps_geometry_error_vec_range+1), inclusive, where "−(asps_geometry_error_vec_range+1)" means a negative value of (asps_geometry_enor_vec_range+1), in a non-limiting embodiment. The number of bits used to represent pdu_3d_corr_vecx [tileID][p] is (asps_geometry_error_vec_precision+1) in this non-limiting embodiment.

And similar for the two other syntax elements for Y and Z shifts.

Another benefit of the embodiments above over the existing syntax elements pdu_3d_offset_u, pdu_3d_offset_v, and pdu_3d_offset_d, is that pdu_3d_corr_vec_x, pdu_3d_corr_vec_y, and pdu_3d_corr_vec_z, allow for floating point corrections if necessary.

In another embodiment, the information from previous embodiments (i.e., signaling in patch data units and/or parameter sets) can be provided as newly-defined Supplemental Enhancement Information (SEI) messages. See block 1006. That would not bound the atlas data to a specific video codec. The correction information could be calculated separately and used when appropriate. For example, the flexibility of SEI messages is beneficial once patches are encoded with alternative video codecs and different sets of corrections need to be provided based on chosen codec.

In another embodiment, the in-loop encoder reconstruction is performed without video coding, but by focusing on minimizing the 3D error caused by quantization of input data and limited precision of 3d offsets (such as shown in FIG. 3C) of different coordinate axes, e.g., from information stored in patch data. This may be performed, e.g., during block 910 and the reconstruction of the 3d mesh from the segmented and encoded 2d projections. The reconstruction error may be minimized by increasing the precision of 3d offsets for a patch. The precision of 3d offsets could be adaptively signaled in (or along with) the bitstream per sequence, frame, tile or patch. See block 1008. The precision is information as in block 925, which may be signaled separately from but corresponding to the signaling of the error vector. In further detail, a normal precision may be defined by the range of 0 to $2^{asps\_geometry\_3d\_bit\_depth\_minus1+1}$. This precision could be increased (or even decreased). Increasing may generally be performed by upping the resolution (increasing asps_geometry_3d_bit_depth_minus1) or sending offsets on a frame, tile, or patch basis.

As specified in 23090-5, the number of bits used to represent depth offset (i.e., pdu_3d_offset_d) of reconstructed patch is calculated according to the following formula:

$$asps\_geometry\_3d\_bit\_depth\_minus1-ath\_pos\_min\_d\_quantizer+1.$$

In another embodiment, signaling (see block 1010) for patch offsets for all reconstructed axes is enabled by adding a flag in a sequence or frame parameter set for indicating the presence of u and v offsets (ps_uv_axis_limits_quantization_ enabled_flag) as well as adding reconstructed u and v axes quantizers (ath_pos_min_u_quantizer and ath_pos_min_v_quantizer), in the sequence or frame parameter set or atlas tile header or patch data unit, which would be applied to pdu_3d_offset_u and pdu_3d_offset_v bit precision respectively according to the following formulas:

$$asps\_geometry\_3d\_bit\_depth\_minus1-ath\_pos\_min\_u\_quantizer+1, \text{ and}$$

$$asps\_geometry\_3d\_bit\_depth\_minus1-ath\_pos\_min\_v\_quantizer+1.$$

An example of per tile header level storage of u- and v-axis precision configurations is displayed in the below table.

|  | Descriptor |
|---|---|
| atlas_tile_header( ) { | |
| ... | |
| if( ath_type != SKIP_TILE ) { | |
| if( asps_normal_axis_limits_quantization_enabled_flag ) { | |
| ath_pos_min_d_quantizer | u(5) |
| ... | |
| if( asps_uv_axis_limits_quantization_enabled_flag ) { | |
| ath_pos_min_u_quantizer | u(5) |
| ath_pos_min_v_quantizer | u(5) |
| } | |

In another embodiment, signaling (block 1012) the precision quantizer is enabled per patch by defining a table of common quantizer values e.g., in atlas_tile_header or in a sequence or frame parameter set and adding an index to the table in the impacted per patch data unit. The information for block 1012 is part of block 925 of FIG. 9, and is other information corresponding to the error vector and sent, e.g., separately from the error vector.

In another embodiment, a common precision quantizer (see block 1014) for all patch level offsets is introduced ath_pos_min_common_quantizer along with a flag asps_ common_axis_limits_quantization_enabled_flag indicating its presence. The flag could be stored in atlas sequence parameter set or frame parameter set. The value for the precision quantizer could be stored in sequence parameter set, frame parameter set, atlas tile header or patch data unit. The information for block 1014 is part of block 925 of FIG. 9, and is other information corresponding to the error vector and sent, e.g., separately from the error vector, In yet another embodiment, rotational correction information is signaled in or along with a V3C or other bitstream. For example, see the description that follows, using the ISO/IEC 23090-5 (V3c)–8.3.7.3 Patch data unit syntax:

|  | Descriptor |
|---|---|
| patch_data_unit( tileID, patchIdx ) { | |
| pdu_2d_pos_x[ tileID ][ patchIdx ] | ue(v) |
| pdu_2d_pos_y[ tileID ][ patchIdx ] | ue(v) |
| pdu_2d_size_x_minus1[ tileID ][ patchIdx ] | ue(v) |
| pdu_2d_size_y_minus1[ tileID ][ patchIdx ] | ue(v) |
| pdu_3d_offset_u[ tileID ][ patchIdx ] | u(v) |
| pdu_3d_offset_v[ tileID ][ patchIdx ] | u(v) |
| pdu_3d_offset_d[ tileID ][ patchIdx ] | u(v) |
| pdu_3d_corr_vec_flag[ tileID ][ patchIdx ] { | u(1) |
| pdu_3d_corr_vec_x[ tileID ][ patchIdx ] | ue(v) |
| pdu_3d_corr_vec_y [ tileID ][ patchIdx ] | ue(v) |
| pdu_3d_corr_vec_z [ tileID ][ patchIdx ] | ue(v) |
| pdu_3d_corr_rot_x [ tileID ][ patchIdx ] | ue(v) |
| pdu_3d_corr_rot_y [ tileID ][ patchIdx ] | ue(v) |
| pdu_3d_corr_rot_z [ tileID ][ patchIdx ] | ue(v) |
| } | |

-continued

| | Descriptor |
|---|---|
| if( asps_normal_axis_max_delta_value_enabled_flag ) | |
| pdu_3d_range_d[ tileID ][ patchIdx ] | u(v) |
| pdu_projection_id[ tileID ][ patchIdx ] | u(v) |
| pdu_orientation_index[ tileID ][ patchIdx ] | u(v) |
| if( afps_lod_mode_enabled_flag ) { | |
| pdu_lod_enabled_flag[ tileID ][ patchIdx ] | u(1) |
| if( pdu_lod_enabled_flag[ tileID ][ patchIdx ] ) { | |
| pdu_lod_scale_x_minus1[ tileID ][ patchIdx ] | ue(v) |
| pdu_lod_scale_y_idc[ tileID ][ patchIdx ] | ue(v) |
| } | |
| } | |
| if( asps_plr_enabled_flag ) | |
| plr_data( tileID, patchIdx ) | |
| if( asps_miv_extension_present_flag ) | |
| pdu_miv_extension( tileID, patchIdx ) /* Specified in ISO/IEC 23090-12 */ | |
| } | |

The pdu_3d_corr_rot_x specifies the x component, qX, for the rotation of the patch with patch index patchIdx using the quaternion representation. The value of pdu_3d_corr_rot_x should be in the range of −214 to 214, inclusive, in a non-limiting example. When pdu_3d_corr_rot_x is not present, its value should be inferred to be equal to 0 in this exemplary embodiment. The value of qX is computed as follows in this example:

$$qX=pdu\_3d\_corr\_rot\_x \div 2^{14}.$$

The pdu_3d_corr_rot_y specifies the y component, qY, for the rotation of the patch with patch index patchIdx using the quaternion representation, in an exemplary embodiment. The value of pdu_3d_corr_rot_y shall be in the range of −214 to 214, inclusive, in a non-limiting embodiment. When pdu_3d_corr_rot_y is not present, its value is inferred to be equal to 0 in this non-limiting embodiment. The value of qY may be computed as follows in this example:

$$qY=pdu\_3d\_corr\_rot\_y \div 2^{14}.$$

The pdu 3d_corr_rot_z specifies the z component, qZ, for the rotation of the patch with patch index patchIdx using quaternion representation. The value of pdu_3d_corr_rot_z is in the range of −214 to 214, inclusive, in this example. When pdu_3d_corr_rot_z is not present, its value shall be inferred to be equal to 0. The value of qZ is computed as follows:

$$qZ=pdu\_3d\_corr\_rot\_Z \div 2^{14}.$$

The fourth component, qW, for the rotation of the current camera model using the quaternion representation is calculated as follows:

$$qW=Sqrt(1-(qX^2+qY^2+qZ^2)).$$

II.D. Exemplary Decoder Embodiment

This section contains information about an exemplary decoder embodiment, which performs both decoding and reconstruction. FIG. 11 is a logic flow diagram for V3C or other video-based coding patch location correction vector usage, in accordance with an exemplary embodiment. FIG. 11 further illustrates the operation of an exemplary method, a result of execution of computer program instructions embodied on a computer readable memory, functions performed by logic implemented in hardware, and/or interconnected means for performing functions in accordance with an exemplary embodiment. The blocks in FIG. 11 may be performed by an apparatus 10, e.g., under control of the control module 40 as implemented via a decoder 800. It is noted that the primary examples use V3C, but other video-based coding may be used.

The flow in FIG. 11 starts in block 1102, where the apparatus 10 receives a bitstream and signaled patch correction vector elements (e.g., and corresponding information) in or along with the bitstream. The bitstream comprises 2d projections of a mesh representation of a 3d object. The patch correction vector elements may modify location and/or rotation of a corresponding patch.

II.D.i. Exemplary Decoding Embodiment

In block 1104, the apparatus 10 performs a decoding process. The decoding process includes (block 1106) applying signaled correction vector elements (e.g., and corresponding information) to corresponding patches during the decoding process.

In one embodiment, the received V3C patch correction vector elements are applied during the V3C or other video-based decoding process as follows (compare Clause 9.2.5.2 of V3C specification, ISO/IEC 23090-5 Visual Volumetric Video-based Coding and Video-based Point Cloud Compression 2nd Edition standard):

$$TilePatch3dOffsetU[tileID][p]=pdu\_3d\_offset\_u[tileID][p]+pdu\_3d\_corr\_vec\_x[tileID][p];$$

$$TilePatch3dOffsetV[tileID][p]=pdu\_3d\_offset\_v[tileID][p]+pdu\_3d\_corr\_vec\_y[tileID][p]; \text{ and}$$

$$TilePatch3dOffsetD[tileID][p]=Pdu3dOffsetD[tileID][p]+pdu\_3d\_corr\_vec\_z[tileID][p].$$

These correction offsets are added in the V3C reconstruction process, as described with reference to FIGS. 3A, 3B, and 3C. The correction offsets are pdu_3d_corr_vec_x, pdu_3d_corr_vec_y, and pdu_3d_corr_vec_z, in this example. It is assumed these can contain location and/or rotation corrections.

II.D.ii. Exemplary Reconstruction Embodiment

Reconstruction is performed after decoding in this example. In more detail, decoding is the process of decoding video components and atlas components to its raw data. Reconstruction is the process of transforming back from the "2D form+patch information" that has been decoded to a 3D form of the object. One could implement a decoder that performs decoding and reconstruction together and output a 3D form of the object. Furthermore, some say reconstruction is part of decoding, while others say reconstruction is separate. While the example of FIG. 11 makes the decoding process and the reconstruction process look completely separate, the reconstruction of block 1108 could be performed as part of the decoding process of block 1104, and the application of the signaled correction vector (e.g., and other corresponding information) is performed at the appropriate stage.

In block 1108, the apparatus 10 reconstructs a 3d mesh from the decoded segmented 2d projections, comprising (block 1110) applying signaled correction vector elements to corresponding patches during the reconstruction. Block 1110 is typically an alternative to block 1106, but it might be possible to perform both blocks.

Thus, in another embodiment with respect to reconstruction, the received V3C patch location correction vector elements (e.g., and corresponding information) are applied (block 1110) during the V3C reconstruction process (block 1108) (compare Annex H.11.5 of ISO/IEC 23090-5):

$$AtlasPatch3dOffsetU[atlasPatchIdx]=\\TilePatch3dOffsetU[tileID][p];$$

$$AtlasPatch3dOffsetV[atlasPatchIdx]=\\TilePatch3dOffsetV[tileID][p];$$

$$AtlasPatch3dOffsetD[atlasPatchIdx]=\\TilePatch3dOffsetD[tileID][p];$$

$$pos3D[AtlasPatchAxisU[pIdx]]=AtlasPatch3dOffsetU\\[pIdx]+pdu\_3d\_corr\_vec\_x[tileID][p]+u;$$

$$pos3D[AtlasPatchAxisV[pIdx]]=AtlasPatch3dOffsetV\\[pIdx]+pdu\_3d\_corr\_vec\_y[tileID][p]+v;$$

$$tempD=(1-2*AtlasPatchProjectionFlag[pIdx])*\\depthValue; and$$

$$pos3D[AtlasPatchAxisD[pIdx]]=Max(0,\\AtlasPatch3dOffsetD[pIdx]+pdu\_3d\_corr\_vec\_z\\[tileID][p]+tempD).$$

The effect for this embodiment is the same as for applying the V3C patch location vector during the decoding. The correction vector elements are pdu_3d_corr_vec_x, pdu_3d_corr_vec_y, and pdu_3d_corr_vec_z, in this example.

In one embodiment, received rotational correction information is applied to the reconstructed patch during the V3C reconstruction process. That is, it is assumed the correction vector can contain location and/or rotation corrections.

In block 1112, the apparatus produces a modified three-dimensional mesh, as an output mesh, based at least on the application of the correction vector elements. In block 1114, the apparatus output the output mesh, e.g., which can then be presented to a user in a 3D format.

III. Additional Examples and Details

The following are additional examples.

Example 1. A method, comprising:

obtaining by an apparatus a mesh representation of a three-dimensional object;

performing by the apparatus an encoding process comprising:

segmenting the three-dimensional object into two-dimensional projections;

encoding the segmented two-dimensional projections into a bitstream;

reconstructing a three-dimensional mesh from the segmented and encoded two-dimensional projections;

deriving an error vector, describing a shift between three-dimensional data, from patches reconstructed from corresponding encoded patches of the bitstream, and original data in the mesh representation, the patches being submeshes of the reconstructed three-dimensional mesh;

signaling by the apparatus the error vector in or along with the bitstream; and transmitting by the apparatus the bitstream and the signaled error vector.

Example 2. The method according to example 1, wherein the shift is described via location correction information, rotation correction information, or both location correction information and rotation correction information.

Example 3. The method according to any one of examples 1 or 2, wherein deriving the error vector comprises summing any rounding and quantization errors introduced during one or more of patch creation, patch projection, patch packing, or patch metadata creation during the encoding, to form an overall error in a three-dimensional space to which the three-dimensional object belongs.

Example 4. The method according to any one of examples 1 or 2, wherein deriving the error vector comprises minimizing a three-dimensional error function of the reconstructed three-dimensional mesh and the original mesh representation of the three-dimensional object.

Example 5. The method according to any one of examples 1 or 2, wherein deriving the error vector comprises deriving the error vector by a combination of minimizing an error function, and summing quantization and rounding errors in a processing chain for the reconstructing.

Example 6. The method according to any one of examples 1 to 5, further comprising signaling, in or along with the bitstream, indication of precision, range or precision and range corresponding to patches of the error vector.

Example 7. The method according to any one of examples 1 to 6, wherein signaling using patch data units or atlas parameter sets is provided in supplemental enhancement information (SEI) messages.

Example 8. The method according to any one of examples 1 to 6, wherein:

the reconstructing is benefited by increasing precision of three-dimensional offset offsets; and the method further comprises signaling, in or along with the bitstream, precision of three-dimensional offsets per sequence, frame, tile, or patch.

Example 9. The method according to any one of examples 1 to 6, further comprising signaling, in or along with the bitstream, information for patch offsets for all reconstructed axes at least by adding a flag in a sequence or frame parameter set for indicating presence of offsets for axes being used and information for reconstructed axes quantizers, the signaling performed using a sequence or frame parameter set or atlas tile header or patch data unit.

Example 10. The method according to any one of examples 1 to 6, further comprising signaling, in or along with the bitstream, that a precision quantizer is enabled per patch at least by a defined table of common quantizer values, and adding an index to the table in corresponding impacted patch data units.

Example 11. The method according to any one of examples 1 to 6, further comprising signaling, in or along with the bitstream, a common precision quantizer for all patch level offsets, along with a flag indicating presence of the common precision quantizer.

Example 12. A method, comprising:

receiving by an apparatus a bitstream and signaled patch correction vector elements in an error vector in or along with the bitstream, the bitstream comprising two-dimensional projections of a mesh representation of a three-dimensional object;

performing by the apparatus a decoding process on the bitstream to at least form decoded two-dimensional projections of the mesh representation;

reconstructing by the apparatus a three-dimensional mesh from decoded two-dimensional projections;

applying by the apparatus the patch correction vector elements from the error vector either in the decoding process or the reconstructing;

producing by the apparatus a modified three-dimensional mesh, as an output mesh, based at least on the application of the correction vector elements; and outputting by the apparatus the output mesh.

Example 13. The method according to example 12, wherein the signaled patch correction vector elements comprise location correction information, rotation correction information, or both location correction information and rotation correction information.

Example 14. The method according to any one of examples 12 or 13, wherein the received signaling further comprises indication of precision, range, or precision and range corresponding to patches of the error vector, and the applying by the apparatus the patch correction vector elements further comprises modifying the precision, range, or precision and range for corresponding patches of the error vector during the applying.

Example 15. The method according to any one of examples 12 to 14, wherein signaling using patch data units or atlas parameter sets is provided in supplemental enhancement information (SET) messages.

Example 16. The method according to any one of examples 12 to 14, wherein:

the receiving further comprises receiving signaling, in or along with the bitstream, precision of three-dimensional offsets per sequence, frame, tile, or patch; and the applying by the apparatus the patch correction vector elements further comprises modifying the precision of three-dimensional offsets per sequence, frame, tile, or patch during the applying.

Example 17. The method according to any one of examples 12 to 14, wherein:

the receiving further comprising receiving, in or along with the bitstream, information for patch offsets for all reconstructed axes at least by adding a flag in a sequence or frame parameter set for indicating presence of offsets for axes being used and information for reconstructed axes quantizers, the signaling performed using a sequence or frame parameter set or atlas tile header or patch data unit; and the applying by the apparatus the patch correction vector elements further comprises using the offsets, in response to the flag indicating presence of the offsets, during the applying.

Example 18. The method according to any one of examples 12 to 14, wherein:

the receiving further receiving signaling, in or along with the bitstream, that a precision quantizer is enabled per patch at least by a defined table of common quantizer values and an index added to the table in corresponding impacted patch data units; and the applying by the apparatus the patch correction vector elements further comprises using the defined table of common quantizer values and the index during the applying.

Example 19. The method according to any one of examples 12 to 14, wherein:

receiving further comprising receiving signaling, in or along with the bitstream, of a common precision quantizer for all patch level offsets, along with a flag indicating presence of the common precision quantizer; and the applying by the apparatus the patch correction vector elements further comprises using, in response to the flag indicating presence of the common precision quantizer, the common precision quantizer during the applying.

Example 20. A computer program, comprising code for performing the methods of any of examples 1 to 19, when the computer program is run on a computer.

Example 21. The computer program according to example 20, wherein the computer program is a computer program product comprising a computer-readable medium bearing computer program code embodied therein for use with the computer.

Example 22. The computer program according to example 20, wherein the computer program is directly loadable into an internal memory of the computer.

Example 23. An apparatus, comprising means for performing:

obtaining by an apparatus a mesh representation of a three-dimensional object;

performing by the apparatus an encoding process comprising:

segmenting the three-dimensional object into two-dimensional projections;

encoding the segmented two-dimensional projections into a bitstream;

reconstructing a three-dimensional mesh from the segmented and encoded two-dimensional projections;

deriving an error vector, describing a shift between three-dimensional data, from patches reconstructed from corresponding encoded patches of the bitstream, and original data in the mesh representation, the patches being submeshes of the reconstructed three-dimensional mesh;

signaling by the apparatus the error vector in or along with the bitstream; and transmitting by the apparatus the bitstream and the signaled error vector.

Example 24. The apparatus according to example 23, wherein the shift is described via location correction information, rotation correction information, or both location correction information and rotation correction information.

Example 25. The apparatus according to any one of examples 23 or 24, wherein deriving the error vector comprises summing any rounding and quantization errors introduced during one or more of patch creation, patch projection, patch packing, or patch metadata creation during the encoding, to form an overall error in a three-dimensional space to which the three-dimensional object belongs.

Example 26. The apparatus according to any one of examples 23 or 24, wherein deriving the error vector comprises minimizing a three-dimensional error function of the reconstructed three-dimensional mesh and the original mesh representation of the three-dimensional object.

Example 27. The apparatus according to any one of examples 23 or 24, wherein deriving the error vector comprises deriving the error vector by a combination of minimizing an error function, and summing quantization and rounding errors in a processing chain for the reconstructing.

Example 28. The apparatus according to any one of examples 23 to 27, wherein the means are further configured to perform: signaling, in or along with the bitstream, indication of precision, range or precision and range corresponding to patches of the error vector.

Example 29. The apparatus according to any one of examples 23 to 27, wherein signaling using patch data units or atlas parameter sets is provided in supplemental enhancement information (SET) messages.

Example 30. The apparatus according to any one of examples 23 to 27, wherein:

the reconstructing is benefited by increasing precision of three-dimensional offset offsets; and he means are further configured to perform: signaling, in or along with the bitstream, precision of three-dimensional offsets per sequence, frame, tile, or patch.

Example 31. The apparatus according to any one of examples 23 to 27, wherein the means are further configured to perform signaling, in or along with the bitstream, information for patch offsets for all reconstructed axes at least by adding a flag in a sequence or frame parameter set for indicating presence of offsets for axes being used and information for reconstructed axes quantizers, the signaling performed using a sequence or frame parameter set or atlas tile header or patch data unit.

Example 32. The apparatus according to any one of examples 23 to 27, wherein the means are further configured to perform signaling, in or along with the bitstream, that a precision quantizer is enabled per patch at least by a defined table of common quantizer values, and adding an index to the table in corresponding impacted patch data units.

Example 33. The apparatus according to any one of examples 23 to 27, wherein the means are further configured to perform signaling, in or along with the bitstream, a common precision quantizer for all patch level offsets, along with a flag indicating presence of the common precision quantizer.

Example 34. An apparatus, comprising means for performing:

receiving by an apparatus a bitstream and signaled patch correction vector elements in an error vector in or along with the bitstream, the bitstream comprising two-dimensional projections of a mesh representation of a three-dimensional object;

performing by the apparatus a decoding process on the bitstream to at least form decoded two-dimensional projections of the mesh representation;

reconstructing by the apparatus a three-dimensional mesh from decoded two-dimensional projections;

applying by the apparatus the patch correction vector elements from the error vector either in the decoding process or the reconstructing;

producing by the apparatus a modified three-dimensional mesh, as an output mesh, based at least on the application of the correction vector elements; and outputting by the apparatus the output mesh.

Example 35. The apparatus according to example 34, wherein the signaled patch correction vector elements comprise location correction information, rotation correction information, or both location correction information and rotation correction information.

Example 36. The apparatus according to any one of examples 34 or 35, wherein the received signaling further comprises indication of precision, range, or precision and range corresponding to patches of the error vector, and the applying by the apparatus the patch correction vector elements further comprises modifying the precision, range, or precision and range for corresponding patches of the error vector during the applying.

Example 37. The apparatus according to any one of examples 34 to 36, wherein signaling using patch data units or atlas parameter sets is provided in supplemental enhancement information (SEI) messages.

Example 38. The apparatus according to any one of examples 34 to 36, wherein:

the receiving further comprises receiving signaling, in or along with the bitstream, precision of three-dimensional offsets per sequence, frame, tile, or patch; and the applying by the apparatus the patch correction vector elements further comprises modifying the precision of three-dimensional offsets per sequence, frame, tile, or patch during the applying.

Example 39. The apparatus according to any one of examples 34 to 36, wherein:

the receiving further comprises receiving, in or along with the bitstream, information for patch offsets for all reconstructed axes at least by adding a flag in a sequence or frame parameter set for indicating presence of offsets for axes being used and information for reconstructed axes quantizers, the signaling performed using a sequence or frame parameter set or atlas tile header or patch data unit; and the applying by the apparatus the patch correction vector elements further comprises using the offsets, in response to the flag indicating presence of the offsets, during the applying.

Example 40. The apparatus according to any one of examples 34 to 36, wherein:

the receiving further comprises receiving signaling, in or along with the bitstream, that a precision quantizer is enabled per patch at least by a defined table of common quantizer values and an index added to the table in corresponding impacted patch data units; and the applying by the apparatus the patch correction vector elements further comprises using the defined table of common quantizer values and the index during the applying.

Example 41. The apparatus according to any one of examples 34 to 36, wherein:

receiving further comprises receiving signaling, in or along with the bitstream, of a common precision quantizer for all patch level offsets, along with a flag indicating presence of the common precision quantizer; and the applying by the apparatus the patch correction vector elements further comprises using, in response to the flag indicating presence of the common precision quantizer, the common precision quantizer during the applying.

Example 42. The apparatus of any preceding apparatus example, wherein the means comprises:

at least one processor; and at least one memory including computer program code, the at least one memory and computer program code configured to, with the at least one processor, cause the performance of the apparatus.

Example 43. An apparatus, comprising:

one or more processors; and one or more memories including computer program code, wherein the one or more memories and the computer program code are configured, with the one or more processors, to cause the apparatus to:

obtain by an apparatus a mesh representation of a three-dimensional object;

perform by the apparatus an encoding process to cause the apparatus to:

segment the three-dimensional object into two-dimensional projections;

encode the segmented two-dimensional projections into a bitstream;

reconstruct a three-dimensional mesh from the segmented and encoded two-dimensional projections;

derive an error vector, describing a shift between three-dimensional data, from patches reconstructed from corresponding encoded patches of the bitstream, and original data in the mesh representation, the patches being submeshes of the reconstructed three-dimensional mesh;

signal by the apparatus the error vector in or along with the bitstream; and transmit by the apparatus the bitstream and the signaled error vector.

Example 44. A computer program product comprising a computer-readable storage medium bearing computer program code embodied therein for use with a computer, the computer program code comprising:

code for obtaining by an apparatus a mesh representation of a three-dimensional object;

code for performing by the apparatus an encoding process comprising:

code for segmenting the three-dimensional object into two-dimensional projections;

code for encoding the segmented two-dimensional projections into a bitstream;

code for reconstructing a three-dimensional mesh from the segmented and encoded two-dimensional projections;

code for deriving an error vector, describing a shift between three-dimensional data, from patches reconstructed from corresponding encoded patches of the bitstream, and original data in the mesh representation, the patches being submeshes of the reconstructed three-dimensional mesh;

code for signaling by the apparatus the error vector in or along with the bitstream; and code for transmitting by the apparatus the bitstream and the signaled error vector.

Example 45. An apparatus, comprising:

one or more processors; and one or more memories including computer program code, wherein the one or more memories and the computer program code are configured, with the one or more processors, to cause the apparatus to:

receive by the apparatus a bitstream and signaled patch correction vector elements in an error vector in or along with the bitstream, the bitstream comprising two-dimensional projections of a mesh representation of a three-dimensional object;

perform by the apparatus a decoding process on the bitstream to at least form decoded two-dimensional projections of the mesh representation;

reconstruct by the apparatus a three-dimensional mesh from decoded two-dimensional projections;

apply by the apparatus the patch correction vector elements from the error vector either in the decoding process or the reconstructing;

produce by the apparatus a modified three-dimensional mesh, as an output mesh, based at least on the application of the correction vector elements; and output by the apparatus the output mesh.

Example 46. A computer program product comprising a computer-readable storage medium bearing computer program code embodied therein for use with a computer, the computer program code comprising:

receiving by an apparatus a bitstream and signaled patch correction vector elements in an error vector in or along with the bitstream, the bitstream comprising two-dimensional projections of a mesh representation of a three-dimensional object;

performing by the apparatus a decoding process on the bitstream to at least form decoded two-dimensional projections of the mesh representation;

reconstructing by the apparatus a three-dimensional mesh from decoded two-dimensional projections;

applying by the apparatus the patch correction vector elements from the error vector either in the decoding process or the reconstructing;

producing by the apparatus a modified three-dimensional mesh, as an output mesh, based at least on the application of the correction vector elements; and outputting by the apparatus the output mesh.

Without in any way limiting the scope, interpretation, or application of the claims appearing below, a technical effect and advantage of one or more of the example embodiments disclosed herein is improved objective metric scores for V3C mesh reconstruction. A technical effect and advantage of one or more of the example embodiments disclosed herein is that the techniques support valid V3C mesh encoder rate-distortion optimization. A further technical effect and advantage of one or more of the example embodiments disclosed herein is that the techniques allow for floating point corrections of the 3D reconstruction.

As used in this application, the term "circuitry" may refer to one or more or all of the following:

(a) hardware-only circuit implementations (such as implementations in only analog and/or digital circuitry) and (b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Embodiments herein may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 8. A computer-readable medium may comprise a computer-readable storage medium (e.g., memories 25 or other device) that may be any media or means that can contain, store, and/or transport the instructions for use by or in connection with an instruction execution system, apparatus, or device, such as a computer. A computer-readable storage medium does not comprise propagating signals.

If desired, the different functions discussed herein may be performed in a different order and/or concurrently with each other. Furthermore, if desired, one or more of the above-described functions may be optional or may be combined.

Although various aspects are set out above, other aspects comprise other combinations of features from the described embodiments, and not solely the combinations described above.

It is also noted herein that while the above describes example embodiments of the invention, these descriptions should not be viewed in a limiting sense. Rather, there are several variations and modifications which may be made without departing from the scope of the present invention.

The following abbreviations that may be found in the specification and/or the drawing figures are defined as follows:

| 2D or 2d | two-dimensional |
|---|---|
| 3D of 3d | three-dimensional |
| 6DOF | six degrees of freedom |
| ACL | atlas coding layer |
| AFPS | atlas frame parameter set |
| ASPS or asps | atlas sequence parameter set |
| CAFPS | common atlas frame parameter set |
| CASPS | common atlas sequence parameter set |
| CfP | call for proposals |
| CGI | computer generated imagery |
| codec | coder/decoder |
| ID | identification |
| MIV | MPEG immersive video |
| MPEG | Motion Picture Experts Group |
| MR | mixed reality |
| NAL | network abstraction layer |
| PDU or pdu | patch data unit |
| RBSP | raw byte sequence payload |
| RDO | rate-distortion optimization |
| SEI | Supplemental Enhancement Information |
| V3C | visual volumetric video-based coding |
| VPCC | video point cloud connection |
| VPS | V3C parameter set |
| VR | virtual reality |

What is claimed is:

1. An apparatus, comprising:
one or more processors; and
one or more memories storing instructions that, when executed by the one or more processors, cause the apparatus at least to perform:
obtaining by the apparatus a mesh representation of a three-dimensional object;
performing by the apparatus an encoding process comprising:
segmenting the three-dimensional object into corresponding segmented two-dimensional projections;
encoding the segmented two-dimensional projections into a bitstream;
reconstructing a three-dimensional mesh from the segmented and encoded two-dimensional projections; and
deriving an error vector, describing a shift between three-dimensional data, from patches reconstructed from corresponding encoded patches of the bitstream, and original data in the mesh representation, the patches being submeshes of the reconstructed three-dimensional mesh, wherein deriving the error vector comprises minimizing a three-dimensional error function of the reconstructed three-dimensional mesh and an original mesh representation of the three-dimensional object;
signaling by the apparatus the error vector in or along with the bitstream; and transmitting by the apparatus the bitstream and the signaled error vector.

2. The apparatus according to claim 1, wherein the shift is described via location correction information, rotation correction information, or both location correction information and rotation correction information.

3. The apparatus according to claim 1, wherein deriving the error vector comprises summing any rounding and quantization errors introduced during one or more of patch creation, patch projection, patch packing, or patch metadata creation during the encoding, to form an overall error in a three-dimensional space to which the three-dimensional object belongs.

4. The apparatus according to claim 1, wherein deriving the error vector comprises deriving the error vector by a combination of minimizing an error function, and summing quantization and rounding errors in a processing chain for the reconstructing.

5. The apparatus according to claim 1, wherein the one or more memories further store instructions that, when executed by the one or more processors, cause the apparatus at least to perform: signaling, in or along with the bitstream, indication of precision, range or precision and range corresponding to patches of the error vector.

6. The apparatus according to claim 1, wherein signaling using patch data units or atlas parameter sets is provided in supplemental enhancement information (SEI) messages.

7. The apparatus according to claim 2, wherein:
the reconstructing is benefited by increasing precision of three-dimensional offset offsets; and
the one or more memories further store instructions that, when executed by the one or more processors, cause the apparatus at least to perform: signaling, in or along with the bitstream, precision of three-dimensional offsets per sequence, frame, tile, or patch.

8. The apparatus according to claim 1, wherein the one or more memories further store instructions that, when executed by the one or more processors, cause the apparatus at least to perform: signaling, in or along with the bitstream, information for patch offsets for all reconstructed axes at least by adding a flag in a sequence or frame parameter set for indicating presence of offsets for axes being used and information for reconstructed axes quantizers, the signaling performed using a sequence or frame parameter set or atlas tile header or patch data unit.

9. The apparatus according to claim 1, wherein the one or more memories further store instructions that, when executed by the one or more processors, cause the apparatus at least to perform: signaling, in or along with the bitstream, that a precision quantizer is enabled per patch at least by a defined table of common quantizer values, and adding an index to the defined table in corresponding impacted patch data units.

10. The apparatus according to claim 1, wherein the one or more memories further store instructions that, when executed by the one or more processors, cause the apparatus at least to perform: signaling, in or along with the bitstream, a common precision quantizer for all patch level offsets, along with a flag indicating presence of the common precision quantizer.

11. An apparatus, comprising:
one or more processors; and
one or more memories storing instructions that, when executed by the one or more processors, cause the apparatus at least to perform:
receiving by the apparatus a bitstream and signaled patch correction vector elements in an error vector in or along with the bitstream, the bitstream comprising two-dimensional projections of a mesh representation of a three-dimensional object, the receiving further comprising receiving indication of precision, range, or precision and range corresponding to patches of the error vector;

performing by the apparatus a decoding process on the bitstream to at least form decoded two-dimensional projections of the mesh representation;

reconstructing by the apparatus a three-dimensional mesh from decoded two-dimensional projections;

applying by the apparatus the patch correction vector elements from the error vector either in the decoding process or the reconstructing, and modifying the precision, the range, or the precision and range for corresponding patches of the error vector during the applying;

producing by the apparatus a modified three-dimensional mesh, as an output mesh, based at least on the application of the patch correction vector elements; and outputting by the apparatus the output mesh.

12. The apparatus according to claim 11, wherein the signaled patch correction vector elements comprise location correction information, rotation correction information, or both location correction information and rotation correction information.

13. The apparatus according to claim 11, wherein:

the receiving further receiving signaling, in or along with the bitstream, that a precision quantizer is enabled per patch at least by a defined table of common quantizer values and an index added to the defined table in corresponding impacted patch data units; and the applying by the apparatus the patch correction vector elements further comprises using the defined table of the common quantizer values and the index during the applying.

14. The apparatus according to claim 11, wherein:

receiving further comprising receiving signaling, in or along with the bitstream, of a common precision quantizer for all patch level offsets, along with a flag indicating presence of the common precision quantizer; and the applying by the apparatus the patch correction vector elements further comprises using, in response to the flag indicating presence of the common precision quantizer, the common precision quantizer during the applying.

15. An apparatus, comprising:

one or more processors; and one or more memories storing instructions that, when executed by the one or more processors, cause the apparatus at least to perform:

receiving by the apparatus a bitstream and signaled patch correction vector elements in an error vector in or along with the bitstream, the bitstream comprising two-dimensional projections of a mesh representation of a three-dimensional object, wherein signaling using patch data units or atlas parameter sets is provided in supplemental enhancement information (SEI) messages;

performing by the apparatus a decoding process on the bitstream to at least form decoded two-dimensional projections of the mesh representation;

reconstructing by the apparatus a three-dimensional mesh from decoded two-dimensional projections;

applying by the apparatus the patch correction vector elements from the error vector either in the decoding process or the reconstructing;

producing by the apparatus a modified three-dimensional mesh, as an output mesh, based at least on the application of the patch correction vector elements; and outputting by the apparatus the output mesh.

16. An apparatus, comprising:

one or more processors; and one or more memories storing instructions that, when executed by the one or more processors, cause the apparatus at least to perform:

receiving by the apparatus a bitstream and signaled patch correction vector elements in an error vector in or along with the bitstream, the bitstream comprising two-dimensional projections of a mesh representation of a three-dimensional object, the receiving further comprises receiving signaling, in or along with the bitstream, precision of three-dimensional offsets per sequence, frame, tile, or patch;

performing by the apparatus a decoding process on the bitstream to at least form decoded two-dimensional projections of the mesh representation;

reconstructing by the apparatus a three-dimensional mesh from decoded two-dimensional projections;

applying by the apparatus the patch correction vector elements from the error vector either in the decoding process or the reconstructing, the applying by the apparatus the patch correction vector elements further comprises modifying the precision of three-dimensional offsets per sequence, frame, tile, or patch during the applying;

producing by the apparatus a modified three-dimensional mesh, as an output mesh, based at least on the application of the patch correction vector elements; and outputting by the apparatus the output mesh.

17. An apparatus, comprising:

one or more processors; and one or more memories storing instructions that, when executed by the one or more processors, cause the apparatus at least to perform:

receiving by the apparatus a bitstream and signaled patch correction vector elements in an error vector in or along with the bitstream, the bitstream comprising two-dimensional projections of a mesh representation of a three-dimensional object, the receiving further comprising receiving, in or along with the bitstream, information for patch offsets for all reconstructed axes at least by adding a flag in a sequence or frame parameter set for indicating presence of offsets for axes being used and information for reconstructed axes quantizers, the signaling performed using a sequence or frame parameter set or atlas tile header or patch data unit;

performing by the apparatus a decoding process on the bitstream to at least form decoded two-dimensional projections of the mesh representation;

reconstructing by the apparatus a three-dimensional mesh from decoded two-dimensional projections;

applying by the apparatus the patch correction vector elements from the error vector either in the decoding process or the reconstructing, the applying by the apparatus the patch correction vector elements further comprises using the offsets, in response to the flag indicating presence of the offsets, during the applying;

producing by the apparatus a modified three-dimensional mesh, as an output mesh, based at least on the application of the patch correction vector elements; and outputting by the apparatus the output mesh.

\* \* \* \* \*